United States Patent [19]
Lam et al.

[11] Patent Number: 5,775,468
[45] Date of Patent: Jul. 7, 1998

[54] HIGH PERFORMANCE TWO-PLY FRICTION MATERIAL

[75] Inventors: Robert C. Lam, Naperville; Marc A. Yesnik, Glen Ellyn, both of Ill.

[73] Assignee: Borg-Warner Automotive, Inc., Sterling Heights, Mich.

[21] Appl. No.: 784,415

[22] Filed: Jan. 16, 1997

[51] Int. Cl.$^6$ .................................................. F16D 69/00
[52] U.S. Cl. .................. 188/251 A; 192/107 M; 428/245; 428/252; 428/298
[58] Field of Search .................. 188/251 A, 251 M, 188/251 R; 192/107 M; 428/245, 246, 252, 280, 282, 284, 288, 298, 304.4, 311.5, 317.9

[56] References Cited

U.S. PATENT DOCUMENTS

| | | | |
|---|---|---|---|
| 2,158,337 | 5/1939 | Rasmussen | 188/250 |
| 2,165,140 | 7/1939 | Harvey et al. | 260/23 |
| 3,270,846 | 9/1966 | Arledter et al. | |
| 4,256,801 | 3/1981 | Chuluda | 428/280 |
| 5,080,969 | 1/1992 | Tokumura | 428/327 |
| 5,083,650 | 1/1992 | Seiz et al. | 523/156 |
| 5,242,746 | 9/1993 | Bommier et al. | 188/251 A X |
| 5,266,395 | 11/1993 | Yamashita et al. | 188/251 A X |
| 5,478,642 | 12/1995 | McCord | 188/251 A X |
| 5,585,166 | 12/1996 | Kearsey | 188/251 A X |
| 5,629,101 | 5/1997 | Watremez | 192/107 M X |

FOREIGN PATENT DOCUMENTS

| | | |
|---|---|---|
| 0 637 698 A1 | 2/1995 | European Pat. Off. |
| 0 640 774 A1 | 3/1995 | European Pat. Off. |
| 0 645 552 A1 | 3/1995 | European Pat. Off. |
| 0 669 482 A2 | 8/1995 | European Pat. Off. |
| 4-216894 | 8/1992 | Japan. |
| 2 260 173 | 4/1993 | United Kingdom. |

*Primary Examiner*—Peter M. Poon
*Attorney, Agent, or Firm*—Emch, Schaffer, Schaub et al; Greg Dziegielewski

[57] ABSTRACT

The present invention relates to a two-ply fibrous base material comprising a primary layer having elastic and oil absorbent characteristics bonded to a secondary layer having high temperature resistance and high strength characteristics. The two-ply fibrous base material, when impregnated with a suitable resin, provides a friction material exhibiting good friction and wear characteristics and is especially useful in high energy end use applications.

15 Claims, 10 Drawing Sheets

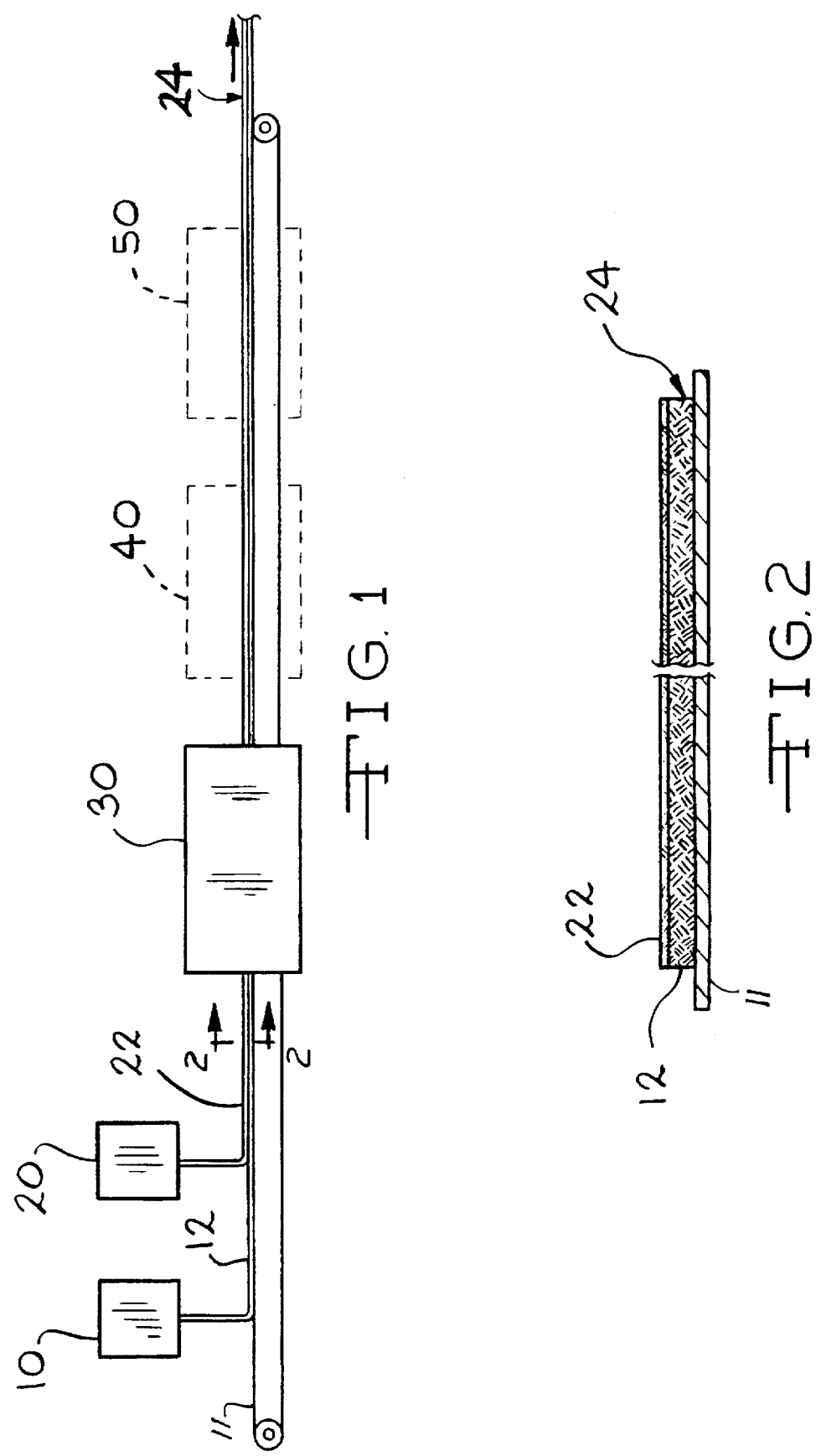

5,775,468

HIGH PERFORMANCE TWO-PLY FRICTION MATERIAL

TECHNICAL FIELD

This invention relates to a high performance two-ply fibrous base material. The fibrous base has a primary layer and a secondary layer which are joined together during a wet paper making process. The two-ply fibrous base material is useful in friction material applications.

The two-ply friction material of the present invention has increased dynamic friction and wear resistant characteristics. The two-ply friction material of the present invention has higher durability and is less costly to produce than conventional one-ply friction materials.

BACKGROUND ART

New and advanced transmission systems and braking systems are being developed by the automotive industry. These new systems often involve high energy requirements. Therefore, the friction materials technology must be also developed to meet the increasing energy requirements of these advanced systems.

In particular, a new high energy type friction material is needed. The new high energy friction material must be able to withstand high speeds wherein surface speeds are up to about 65 m/second. Also, the friction material must be able to withstand high facing lining pressures up to about 1500 psi. It is also important that the friction material be useful under limited lubrication conditions.

The friction material must be durable and have high heat resistance in order to be useful in the advanced transmission and braking systems. Not only must the friction material remain stable at high temperatures, it must also be able to rapidly dissipate the high heat that is being generated during operating conditions.

The high speeds generated during engagement and disengagement of the new transmission and braking systems mean that a friction material must be able to maintain a relatively constant friction throughout the engagement. It is important that the frictional engagement be relatively constant over a wide range of speeds and temperatures in order to minimize "shuddering" of materials during braking or the transmission system during power shift from one gear to another.

Previously, asbestos fibers were included in the friction material for temperature stability. For example, the Arledter et al. U.S. Pat. No. 3,270,846 patent describes phenolic and phenolic-modified resins used with asbestos. Now, however, due to health and environmental problems, asbestos is no longer being used. More recent friction materials have attempted to overcome the absence of the asbestos in the friction material by modifying the impregnating paper or fiber materials with phenolic or phenolic-modified resins. These friction materials, however, do not rapidly dissipate the high heat generated, and do not have the necessary heat resistance and satisfactory high coefficient of friction performance now needed for use in the high speed systems currently being developed.

Friction materials are often used in "wet" applications where the friction material is "wetted" or impregnated with a liquid such as brake fluid or automatic transmission fluid during use. During use of the "wet" friction material, the fluid is ultimately squeezed from or is impregnating the friction material. Wet friction materials differ greatly, both in their compositions and physical characteristics from "dry" friction materials.

In order for friction materials to be useful in "wet" applications, the friction material must have a wide variety of acceptable characteristics. The friction material must be resilient or elastic yet resistant to compression set, abrasion and stress; have high heat resistance and be able to dissipate heat quickly; and, have long lasting, stable and consistent frictional performance. If any of these characteristics are not met, optimum performance of the friction material is not met.

Thus, it is also important that a suitable friction lining or fibrous base material be used to form a high energy application friction material. The friction material must have good shear strength both when saturated with the wet resin during impregnation and when saturated with brake fluid or transmission oil during use.

It is also important, under certain applications, that the friction material have high porosity such that there is a high fluid permeation capacity during use. Thus, it is important that the friction material not only be porous, it must also be compressible. The fluids permeated into the friction material must be capable of being squeezed or released from the friction material quickly under the pressures applied during operation of the brake or transmission, yet the lining material must not collapse. It is also important that the friction material have high thermal conductivity to also help rapidly dissipate the heat generated during operation of the brake or transmission.

Friction materials which met these demanding characteristics often include a fibrous base material having aramid-type fibers. However, these fibers and other ingredients used in the fibrous base material are expensive which increases the cost of the friction material.

As far as is known, there is no disclosure of a friction material for use in transmission systems which includes two-plies or layers of fibrous base materials which have sufficient strength to be useful in high energy applications.

Accordingly, it is an object of the present invention to provide an improved friction material with reliable and improved properties compared to those of the prior art.

A further object of this invention is to provide friction materials with high thermal conductivity, porosity and strength.

As a result of extensive research in view of the need for a better friction material, a friction material with improved characteristics has now been developed.

DISCLOSURE OF THE INVENTION

In order to achieve the requirements discussed above, many materials were evaluated for friction and heat resistant characteristics under conditions similar to those encountered during operation. Both commercially available brake linings and transmission materials were investigated and proved not to be suitable for use in high energy applications. The present invention is especially useful in brakes and in clutch applications. In one aspect, the present invention provides a fibrous base material comprising two-plies or layers of material.

The two-ply fibrous base material comprises a first or bottom layer and a second or top layer adjacent the first layer. The second layer comprises high temperature resistant and high strength fibers and friction paper-forming materials such as, for example, fillers and/or friction modifying particles. In certain preferred embodiments, the first layer is more elastic and more oil absorbent that the second layer.

In one aspect of the present invention the primary layer is highly porous, non-linearly elastic and has a low compression set while the secondary layer has a high temperature, high energy and low compression set formulation.

Another aspect of the present invention relates to the two-ply fibrous base material impregnated with at least one suitable resin for forming a friction material. The two-ply friction material is especially useful for friction materials for clutch friction plates, bands, synchronizer rings and related transmission friction products.

The fibrous base material can be impregnated using different resin systems. In certain embodiments, it is useful to impregnate the fibrous based material with a phenolic resin or a modified phenolic-based resin. It has now been discovered that, in certain embodiments, when a silicone resin is blended or mixed with a phenolic resin in compatible solvents and that silicone-phenolic resin blend is used to impregnate a fibrous base material of the present invention, a high energy friction material is formed. Such high energy friction material has high friction stability and high heat resistance.

The friction material of the present invention prevents uneven lining wear and therefore the formation of separator plate "hot spots" from developing during the useful life of the friction material. When there is little uneven wear on the friction material, there is more likelihood to maintain "steady state" of the clutch or brake components and therefore, more consistent performance of the clutch and brake. Further, the friction material of the present invention shows good shear strength such that the friction material resists delamination during use.

The layers of the two-ply fibrous base material are joined together during a wet paper making process. A primary or bottom layer of friction material is formed which comprises fibers and/or fillers and/or friction particles. A secondary or top layer of friction material comprises fibers and/or fillers and/or friction particles is formed on top of the primary layer. The secondary layer has a friction material formulation which provides optimum performance characteristics during use. In certain embodiments, the secondary layer can comprise up from about 2% to about 50% of the total combined two-ply fibrous base material thickness. In certain embodiments the secondary layer can have a composition different from that of the primary layer and/or can have the same composition, but different densities.

According to the present invention, the secondary layer contains ingredients chosen to achieve the performance requirements of a particular end-use application. The primary layer ingredients are selected such that they compliment the performance of the top layer. Proper selection of the combined secondary and primary layer ingredients influences characteristics of the friction material. Such performance characteristics as durability, friction wear, lubricity, permeability, elasticity and other related performance characteristics are enhanced using the two-ply material of the present invention.

The two-ply friction material of the present invention possesses physical characteristics that are unattainable from a single-ply friction material. The two-ply friction material of the present invention is then saturated with a resin chosen to enhance the friction characteristics of the two-ply material. The two-ply material of the present invention has increased durability and high friction performance compared to single-ply friction materials.

BRIEF DESCRIPTION OF THE DRAWINGS

FIG. 1 is a general schematic diagram showing a method for forming a two-ply friction material.

FIG. 2 is a cross-section taken along the line 2—2 in FIG. 1, generally showing a two-ply friction material.

BEST MODE OF CARRYING OUT THE INVENTION

Figure 3:
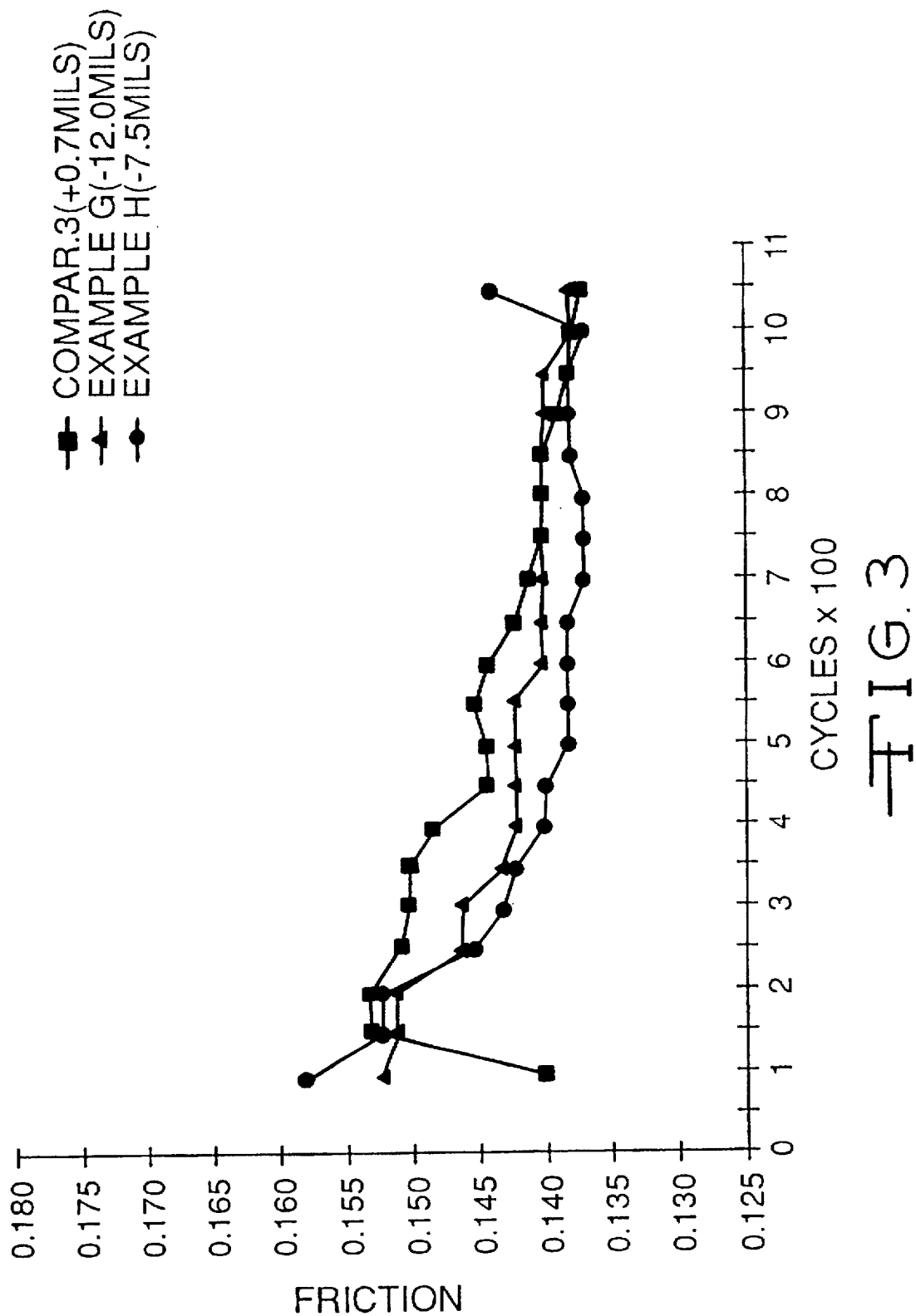
FIG. 3 is a graph comparing the dynamic coefficient of friction as the number of cycles increases for comparative Sample 3 and Examples G and H.

In one aspect of the present invention provides a two-ply fibrous base material. The fibrous base material has a primary layer of one composition and/or density and a secondary layer adjacent the primary layer having a different composition and/or density. The thickness and composition of each layer can vary as the end use application needs change. The two-ply fibrous base material contains ingredients which provide optimum results for the end use friction applications. The secondary layer is adjacent the area of contact in a clutch or friction lining application. The use of the various ingredients in the secondary layer provides a cost efficient friction material and allows the optimum use of such ingredients that may have otherwise been eliminated from formulations because of high costs. Further, the secondary layer provides a structure that is especially useful in high energy applications. It is further surprisingly found that the two-ply friction material has increased friction characteristics and decreased wear. Further, the two-ply friction material is more durable than conventional friction materials.

In various embodiments of the present invention, the primary or bottom layer comprises a composition comprising, for example, at least one type of fiber and at least one type of filler material. The secondary or upper layer has a composition which differs from the primary layer. The secondary layer comprises, for example, high temperature resistance and high strength fibers, fillers and friction particles. The ingredients in the secondary layer provide optimum performance characteristics.

In other embodiments of the present invention, the primary layer and secondary layer can comprise the same composition, but have different basis weights and/or densities. In especially preferred embodiments, the primary layer has a low density, while the secondary layer has a high density. In such embodiments, the primary and secondary layers can both comprise one or more types of fibers, fillers and friction particles.

Various types of fibrous or raw pulp materials are useful in the present invention. Partially useful fibrous materials can be comprised of cotton fibers, glass fibers, carbon fibers and/or aramid polyamide fibers such as aramid floc and/or pulp fibers which are generally designated as aromatic polycarbonamide materials. It is to be understood that various paper formulations are useful in the present invention and that other fibrous materials can be present in the fibrous base material formulations. For example, cotton burns at a relatively low temperature of approximately 350° C. Therefore, a friction material has a range of expected thermal stability based on the ingredients used in the fibrous base material during the paper forming process. The fibrous base materials which comprise relatively high percentages of carbon would be less thermally stable than fibrous base materials containing more thermally stable ingredients such as aramid pulps. The range and percentages of such ingredients are dependent upon the end use of the friction material and whether such friction material is to be subjected to moderate energy requirements or high energy requirements.

It is to be understood that various fillers are useful in the two-ply fibrous base material of the present invention. In particular, silica fillers such as diatomaceous earth and/or silica are especially useful. However, it is contemplated that other types of fillers are suitable for use in the present invention and the choice of filler depends upon the particular end use requirements of the two-ply friction material.

In preferred embodiments, the secondary layer comprises fibers such as aramid pulp, carbon and glass fibers, fillers such as diatomaceous earth and/or silica, and processing aids such as silicon nitride and other friction particles. It has been surprisingly found that when silicon nitride powder is incorporated into the fibrous base material formulation, there is an improvement in the dynamic coefficient of friction characteristics in the resulting friction material. This is especially surprising since fibers of silicon nitride are not suitable for inclusion in friction materials due to their abrasiveness of the silicon nitride fibers to the clutch or brake parts. In preferred embodiments, the silicon nitride particles have an average diameter of size from about 0.5 to about 1.5 microns. In certain embodiments, it has been found that silicon nitride particles having an average diameter size of about 1 micron work exceptionally well. One type of silicon nitride particles is available as $Si_3N_4$. The silicone nitride particles increase the dynamic coefficient of friction when used at low levels of about 3% to about 15%. In various preferred embodiments, the silicone nitride composition can comprise from about 4% to about 6%.

It is to be understood that if the initial coefficient of friction is low, than a friction material does not achieve its desired constant coefficient of friction value until after many uses or cycles of the friction material. The present invention provides a two-ply friction material having a high initial coefficient of friction. Further, when the dynamic coefficient of friction is close to the static coefficient of friction, there is a smooth transfer from one gear to another in a clutch operation. The present invention achieves a surprisingly good static-to-dynamic coefficient of friction ratio with the addition of silicon nitride particles in the friction material.

It is further contemplated that other ingredients such as friction particles and processing aids are useful in the fibrous base materials. These friction particle ingredients include, for example, cashew nut shell liquid particles and/or rubber-type or elastomeric polymer particles. In especially preferred embodiments, the elastomeric polymer particles comprise about 70% to about 75% elastomeric material (such as isoprene and/or nitride rubber materials) with the balance being processing aids. The elastomeric particles are useful to provide additional friction lining wear resistance. The rubber-type particles allow the friction materials to conform more closely to the mating parts (such as separator plates and a clutch) and therefore provide an increase in "real" versus "apparent" areas of contact between the separator plates. The friction particles increase the energy capacity of the two-ply friction material.

In addition, carbon fibers are useful in various embodiments. The carbon fibers act as a reinforcement member for the friction material matrix. The carbon fibers increase wear resistance and lining compression resistance. When a friction lining material is exhibiting these two characteristics, there is an improvement in fluid capillary flow through the friction material. The increase in compression resistance prevents or decreases the friction material's chance of collapsing such that the capillary flow is maintained and sometimes improved. In various embodiments, the carbon fibers can be present at a range of about 20% to about 40%, and preferably about 30%; and, the remaining upper or secondary layer comprises about 60% to about 80% and preferably about 70% aramid fiber.

In various embodiments, it is useful to include further ingredients such as novoloid fibers which comprise a cross-linked phenolformaldehyde polymer. In certain embodiments, it has been found that a combination of novoloid fibers wherein one fiber type has a relatively shorter length with an average length of about 0.2 mm and another fiber type has a relatively longer length with an average length of about 3 mm is especially useful. While not wishing to be held to any one theory, it is believed that the relatively shorter fibers act more like particles than like fibers and therefore act like a binder type material in the friction material. The shorter particle-like novoloid fibers provide an improved strength to the friction paper. The relatively longer fibers, provides strength and structure to the friction material by preventing collapse of the friction material when the friction material is under pressure. While not wishing to be held to any particular theory, it is believed that the novoloid fibers, which are chemically similar to the phenolic resins which are present in the friction material, bond to the phenolic resin material to help provide both mechanical and chemical strength to the friction material.

The use of synthetic graphite in the fibrous base material provides a more three-dimensional structure to the fibrous base material than other types of graphite. Synthetic graphite which has a high thermal conductivity provides the friction material with the ability to dissipate heat more rapidly than other types of graphite. Various types of suitable synthetic graphite are contemplated as being useful with the present invention. For example, synthetic graphite can be made by graphitization of a raw stock material such as petroleum coke and a coal tar pitch binder. The raw materials are mixed and heated to temperatures of about 2800° to about 3000° C. and special graphadizing furnaces which convert the baked carbon body into a polycrystalene graphite article. In certain embodiments, it is preferred that the size and geometry of the synthetic graphite be in the range of about 20 to about 50 m. In these certain embodiments, it has been discovered that if the graphite particle is too large or too small, there is not the optimum three-dimensional structure and consequently the heat resistant is not as optimum. In various embodiments it is contemplated that the ingredients comprising the primary and/or the secondary layers can include a suitable resin material.

In certain embodiments, the primary or bottom layer comprises cotton fibers and a filler material such as diatomaceous earth. In preferred embodiments, the primary layer comprises, in weight percent, based on the weight of the primary layer, from about 50% to about 75% cotton fibers and about 25% to about 50% filler material. In especially preferred embodiments, the primary layer comprises about 60% cotton and about 40% filler material.

In other preferred embodiments, the primary layer comprises cotton, glass fibers and filler material. In such preferred embodiments, the primary layer comprises, in weight percent, based on the weight of the primary layer, about 40% to about 50% and most preferably about 45% cotton fibers, about 10% to about 20%, and most preferably about 15% glass fibers, and about 30% to about 50% and most preferably about 40% filler material.

It is contemplated that, in certain other embodiments, the secondary layer of the two-ply fibrous base material can be formed from an aqueous slurry comprising about, by weight, 4 to about 90% aramid floc or fibers; about 0% to about 50% cotton fibers; about 0% to about 70% carbon fibers; about 0% to about 10% glass fibers; about 5% to about 70% filler materials; about 3% to about 50% silicon nitride powder particles; about 0% to about 30% elastomeric polymer friction particles; about 0% to about 40% silica particles and about 0% to about 3% latex processing aid, based on the weight of the aqueous slurry formulation for the second or upper layer of the fibrous base material.

In certain other embodiments, the secondary layer of the fibrous base material preferably comprises about, by weight: 20% to about 40% aramid floc or fibers; 15% to about 35% diatomaceous earth materials; 10% to about 30% silica particles; 5% to about 25% elastomeric polymer friction particles; and 3% to about 20% glass fibers.

In certain other embodiments, the secondary layer of the two-ply fibrous base material preferably comprises about, by weight: 30% to about 50% cotton fibers; 3% to about 10% aramid floc or fibers; 10% to about 20% filler materials; 3% to about 10% silicon nitride particles; 15% to about 25% elastomeric polymer friction particles; 0% to about 20% glass fibers; and 0% to about 25% novoloid fibers.

It is one aspect of the present invention that the secondary layer of the two-ply fibrous base material can be formed from an aqueous slurry comprising about, by wt..: from about 10 to about 40% porous activated carbon particles, about 10 to about 30% cotton fibers, about 5 to about 30% precision cut fibers having a preferred length ranging from about 0.5 to about 6mm, about 0 to about 20% synthetic graphite about 0 to about 40% filler such as diatomaceous earth and about 0 to about 20% of friction modifiers such as cashew shell nut liquid particles and the like, based on the weight of the aqueous slurry formulation for the secondary layer of the fiber base material.

The primary or bottom layer of the two-ply fiber base material can be formed from aqueous slurry comprising, about, by wt.: from about 0 to about 60% cotton fibers, most preferably about 55%; about 10 to 40% filler material, most preferably about 35%; about 5 to about 30% non-linearly elastic fibers, most preferably about 10%; and, about 0 to about 3% latex processing aid, most preferably about 2%; based on the weight of the aqueous slurry formulation for the bottom or primary layer of the fiber base material.

In especially preferred embodiments, the nonlinear elastic fibers can comprise polyethelyne terephthalate (PET), glass fibers, and silicate types of materials.

In certain embodiments, the secondary layer preferably comprises about 10 to about 55% cotton fibers, about 5 to about 45% precision cut aramid fibers, about 0 to about 40% celite or diatomaceous earth filler, about 0 to about 20% synthetic graphite, and about 0 to about 40% porous carbon.

The ingredients which comprise the secondary or upper layer are mixed together to a substantially homogenous blend and are deposited on top of the primary layer. It is to be understood that various methods for depositing the secondary layer on top of the primary layer can be made according to the present invention.

The process for making the two-ply fibrous base material of the present invention comprises adding the ingredients of the primary or bottom layer material to form a substantially homogeneous blend. A paper is formed into a fibrous base material from the homogenous blend.

FIG. 1 provides a schematic diagram of one method for forming a two-ply fibrous base material. A first dispensing means 10 supplies the ingredients to form a primary or lower layer 12 of a two-ply fibrous base material 24. The ingredients forming the primary layer 12 are supplied onto a suitable surface 11 which holds or conveys the primary layer 12. It is to be understood that various surfaces 11 can be used with the present invention. A second dispensing means 20 generally supplies the ingredients to form a secondary or upper layer 22 on to the primary layer 12 to form a two-ply material 24. It is to be understood that suitable dispensing means 10 and 20 can comprise a header box or roller means or other suitable apparatus to apply a generally uniform layer of the primary layer 12 and the secondary layer 22 to form the two-ply material 24.

In various embodiments, it is contemplated that the ingredients comprising the primary and/or the secondary layers can include a suitable resin material. In such embodiments, the two ply material 24 is dried by a suitable drying means 30 to remove excess moisture from the two ply material and/or to cure the resin that is present in the two ply material. In certain embodiments it is contemplated that the drying means can comprise heat rolls or infrared heating means or suitable heating means. It is to be understood that in embodiments were the ingredients comprising the primary and secondary layers do not contain a resin, the two ply fibrous base material can be formed and then saturated or impregnated with a suitable resin or resin combination, as shown in phantom in FIG. 1, by a suitable impregnating means 40. The impregnated two ply material can then be dried by a further suitable drying means 50 to remove excess moisture and/or cure the resin.

FIG. 2 generally shows a cross-section of the two-ply fibrous base material 24 comprised of the primary or lower layer 12 and the secondary or upper layer 22. The embodiment shown in FIG. 2 is shown for purposes of general illustration. It is to be understood that the secondary layer can preferably comprise from about 2% to about 50% of the thickness of the two-ply fibrous base material. In preferred embodiments, the secondary layer comprises from about 10% to about 50% of the thickness of the material and in certain preferred embodiments, about 10 to abut 20%.

It has been surprisingly found that the secondary layer sufficiently bonds to the primary layer, such that essentially no delamination problems occur during use of the two-ply material of the present invention.

The friction material of the present invention has adequate interfacial strength and is readily bonded to a suitable substrate such as a clutch plate or used as a brake lining material.

According to the present invention, various types of resins are useful to saturate the two-ply fibrous base material. The type of resin used to saturate a fibrous base material can influence the performance of the resulting friction material. The degree of toughness that a resin exhibits may be reflected by the friction material being able to maintain its integrity when tested. It is important that both the physical and frictional characteristics of the friction material remain intact during the expected service period of the end use product. A friction material impregnated with a brittle resin may crack under a heavy load which acts to collapse the open porous structure of the friction material matrix. On the other hand, a friction material impregnated with an elastomeric resin would provide desired coefficient and torque, but may lack the wear resistance and strength required to hold the friction material matrix intact. Thus, an ideal resin formulation has high strength and is still flexible. A resin with high toughness provides optimum friction performance.

Various resins useful in the present invention include phenolic resins and phenolic-based resins. It is to be understood that various phenolic-based resins which include in the resin blend other modifying ingredients, such as epoxy, butadiene, silicone, tung oil, benzene, cashew shell nut oil and the like, are contemplated as being useful with the present invention. In the phenolic-modified resins, the phenolic resin is generally present at about 50% or greater by weight (excluding any solvents present) of the resin blend. However, it has been found that friction materials, in certain embodiments, can be improved when the impregnant resin blend contains about 5 to about 80%, by weight, and for certain purposes, about 15 to about 55%, and in certain embodiments about 15 to about 25%, by weight, of silicone resin based on the weight of the silicone-phenolic mixture (excluding solvents and other processing acids).

Silicone resins useful in the present invention include, for example, thermal curing silicone sealants and silicone rubbers. Various silicone resins are useful with the present invention. One resin, in particular, comprises xylene and acetylacetone (2,4-pentanedione). The silicone resin has a boiling point of about 362° F. (183° C.), vapor pressure at 68° F. mm. Hg: 21, vapor density (air=1) of 4.8, negligible solubility in water, specific gravity of about 1.09, percent volatile, by weight, 5% evaporation rate (ether=1), less than 0.1, flash point about 149° F. (65° C.) using the Pensky-Martens method. It is to be understood that other silicone resins can be utilized with the present invention. Other useful resin blends include, for example, a suitable phenolic resin comprises (% by wt.): about 55 to about 60% phenolic resin; about 20 to about 25% ethyl alcohol; about 10 to about 14% phenol; about 3 to about 4% methyl alcohol; about 0.3 to about 0.8% formaldehyde; and, about 10 to about 20% water. Another suitable phenolic-based resin comprises (% by wt.): about 50 to about 55% phenol/formaldehyde resin; about 0.5% formaldehyde; about 11 % phenol; about 30 to about 35% isopropanol; and, about 1 to about 5% water.

It has also been found that another useful resin is an epoxy modified phenolic resin which contains about 5 to about 25 percent, by weight, and preferably about 10 to about 15 percent, by weight, of an epoxy compound with the remainder (excluding solvents and other processing aids) phenolic resin. The epoxy-phenolic resin compound provides, in certain embodiments, higher heat resistance to the friction material than the phenolic resin alone. It further contemplated that other ingredients and processing aids known to be useful in both preparing resin blends and in preparing impregnating fibrous-based materials can be included in the friction materials.

In particular, for the embodiments where a phenolic resin and silicone resin are used, no new compound is formed when the silicone resin and phenolic resin are blended together. The resins cure separately and no new compound is formed.

Both the silicone resin and the phenolic resin are present in solvents which are compatible to each other. These resins are mixed together (in certain preferred embodiments) to form a homogeneous blend and then used to impregnate a fibrous base material. There is not the same effect if a fibrous base material is impregnated with a phenolic resin and then a silicone resin is added thereafter or vice versa. There is also a difference between a mixture of a silicone-phenolic resin solution, and emulsions of silicone resin powder and/or phenolic resin powder. When silicone resins and phenolic resins are in solution they are not cured at all. In contrast, the powder particles of silicone resins and phenolic resins are partially cured. The partial cure of the silicone resins and the phenolic resins inhibits a good impregnation of the fibrous base material.

The fibrous base material is impregnated with a blend of a silicone resin in a solvent which is compatible with the phenolic resin and its solvent. In one embodiment, isopropanol has been found to be an especially suitable solvent. It is to be understood, however, that various other suitable solvents, such as ethanol, methyl-ethyl ketone, butanol, isopropanol, toluene and the like, can be utilized in the practice of this invention. The presence of a silicone resin, when blended with a phenolic resin and used to impregnate a fibrous base material, causes the resulting friction materials to be more elastic than fibrous base materials impregnated only with a phenolic resin. When pressures are applied to the silicone-phenolic resin blended impregnated friction material of the present invention, there is a more even distribution of pressure which, in turn, reduces the likelihood of uneven lining wear. After the silicone resin and phenolic resin are mixed together, the mixture is used to impregnate a fibrous base material.

Various methods for impregnating materials can be practiced with the present invention. The fibrous base material is impregnated with the phenolic or modified phenolic resin, preferably so that the impregnating resin material comprises about 30 to about 65 parts, by weight, per 100 parts, by weight, of the friction material. After the fibrous base material has been impregnated with the resin, the impregnated fibrous base material is heated to a desired temperature for a predetermined length of time to form the friction material. The heating cures the phenolic resin at a temperature of about 300°–350° F. When other resins are present, such as a silicone resin, the heating cures the silicone resin at a temperature of about 400° F. Thereafter, the impregnated and cured friction material is adhered to the desired substrate by suitable means.

The following examples provide further evidence that the two-ply fibrous base material and the two-ply friction material of the present invention are an improvement over conventional friction materials. Various preferred embodiments of the invention are described in the following examples, which, however, are not intended to limit the scope of the invention.

It is also to be understood that the type of lubricant used in a wet friction environment affects the characteristics of the two-ply friction material. Lubricants influence the performance of various characteristics of the resulting two-ply friction material, including static friction, dynamic friction (and therefore static/dynamic ratio), viscosity, viscosity index, oxidation stability, extreme pressure capability and the like. The interface between the two-ply friction material and the desired substrate and the mechanical and chemical factors effect the friction material's performance. The two-ply friction material of the present invention is useful with various lubricants. The selection of the optimum ingredients and range of ingredients can be determined by evaluating conditions under which the friction material will be exposed and the type of lubricant materials to be used in such system.

EXAMPLE I

Various compositions of two-ply fibrous base materials were formed and saturated with a phenolic resin to about a 30%–35% pickup level and cured to form two-ply friction materials. The following materials were used in Example I as shown in Table 1 below.

TABLE 1

| | |
|---|---|
| All two-ply papers (Ex. A, B, C, D, E and F) have a primary or first layer of cotton 60% and celite 40%. | |
| Compar. 1 | One-Ply of cotton 60%, celite 40% Basis Wt. = 125, Caliper 0.019" |
| Ex. A | Second-Ply of aramid floc and/or fiber 5% Basis Wt. = 150, Caliper = 0.022" |
| Ex. B | Second-Ply of aramid floc and/or fiber 5% and silicon nitride - 1.2% Basic Wt. = 150, Caliper = 0.023" |
| Ex. C | Second-Ply of aramid floc and/or fiber Pri. Layer Basis Wt. = 185–189, Sec. Layer Basis Wt. = 24–27, Total Basis Wt. = 212–217, Caliper = 0.030" |
| Ex. D | Second-Ply of aramid floc and/or fiber 90% and silicon nitride 10% Pri. Layer Basis Wt. = 183–185, Sec. Layer Basis Wt. = 16–26, Total Basis Wt. = 201–209, Caliper = 0.028" |
| Ex. E | Second-Ply of Formulation #1: aramid floc and/or fiber 30%, celite 25%, silica particles 20%, Friction particles: isoprene type elastomeric particles 15%, and glass fibers 10% Pri. Layer Basis Wt. = 148, Sec. Layer Basis Wt. = 32–40, Total Basis Wt. = 180–188, Caliper = 0.025" |
| Ex. F | Second-Ply of aramid floc and/or fibers 70% and carbon fibers 30% Pri. Layer Basis Wt. = 167–170, Sec. Layer Basis Wt. = 25–26, Total Basis Wt. = 193–195, Caliper = 0.028" |
| Compar. 2 | One-Ply of cotton 55%, aramid pulp 25%, celite 45% |

In order to obtain information about the relative lubricant penetration characteristics of a material, oil drop times were recorded.

These times generally reflect oil absorption characteristics of a material.

Three or four drops of Exxon 1975 Type "H" automatic transmission fluid were used per plate for these tests.

The materials that performed poorly in the friction test discussed below tended to have high oil drop times of about 200 seconds or more. The second set of samples have a slightly higher oil drop time compared to the first set of samples which indicates less lubricant flow into and through the assembly. The second set of samples were processed with different fiber and particle formations. This improved secondary layer formation also slightly reduced oil flow into the assemblies. The specific oil drop times on selected materials are shown in Table 2 below.

TABLE 2

| | Oil Drop Data | | |
|---|---|---|---|
| Material | Average Time (sec.) | Std. Dev. | No. of Full Pack Cycles * |
| | First Round | | |
| Compar. 1 | 284.7 | 42.8 | 60 |
| Ex. A | 88.9 | 10.1 | 1050 |
| Ex. B | 46.7 | 11.4 | 1050 |
| | Second Round | | |
| Ex. C | 114.1 | 26.5 | 1050 |
| Ex. D | 63.0 | 12.1 | 400 |

TABLE 2-continued

| | Oil Drop Data | | |
|---|---|---|---|
| Material | Average Time (sec.) | Std. Dev. | No. of Full Pack Cycles * |
| Ex. E | 198.2 | 38.9 | 69 |
| Ex. F | 96.4 | 9.9 | 300 |

* See Procedure 528A for test specifications

The first set of test materials (Compar. 1, Ex. A and B) compares the distribution of fibers and then a combination of fiber and particle. The control single-ply paper (Compar 1) consisted of only cotton and celite. These two ingredients were selected because of their oil absorption capabilities and economical benefit.

The Ex. A material utilized a cotton and celite base with aramid fiber as the top layer to concentrate this rather expensive fiber at the point of contact. Advantages of using aramid fibers include an inherent high thermal resistance, a cost reduction per plate and providing an upper layer of two-ply paper that has an open structure which allows oil retention.

Ex. B comprises fiber and particle combination to take advantage of the benefits of aramid fibers mentioned above, plus the favorable performance characteristics of silicon nitride which contributes to an increased friction coefficient. The use of this ingredient in the secondary layer application is especially appropriate due to its relatively high cost.

Low Velocity Friction Apparatus (LVFA) tests shown in Table 3 below were performed to evaluate and rank the frictional performance of the two-ply materials. Ex. B performed with only a slight change of friction magnitude compared to Ex. A. The tests essentially revealed on variation in performance using the different materials. However, Ex. A and B did result in slightly less lining wear than the Compar. 2 example.

TABLE 3

| | LVFA Data - 120 psi Exxon 1975 Lubrication Tumbled Steel Separator Plates | | |
|---|---|---|---|
| Material Tested | Static Friction | Dynamic Friction | Lining Wear mils |
| Compar. 1 | .102 | .144 | 0.3 |
| Ex. A | .106 | .147 | 0.2 |
| Ex. B | .101 | .144 | 0.4 |
| Compar. 2 | .103 | .149 | 1.4 |

The data resulting from Full Pack testing indicates an improved 25 performance associated with the use of two-ply friction materials that contain silicon nitride particles. Silicon nitride particle addition to the secondary layer increases dynamic friction from 0.119 to 0.128, with no increase of lining wear. A summary of the full pack friction and wear results are given below in Table 4 below.

TABLE 4

Full Pack Laboratory Data
Exxon 1975 Lubrication

| Materials | Dynamic Friction After 1050 Cycles | Average Pack Loss (mils) |
|---|---|---|
| Compar. 1 | NA (stopped after 50 cycles) | severe damage |
| Ex. A | .119 | 12.1 |
| Ex. B | .128 | 12.3 |
| Compar. 2 | .117 | 10.0 |

LVFA tests were run to evaluate and rank the friction performance of two-ply materials. A summary of the friction and wear data is given in Table 5 below.

TABLE 5

LFVA Data - 120 psi
Exxon 1975 Lubrication
Tumbled Steel Plates

| Material Tested | Static Friction | Dynamic Friction | Lining Wear mils |
|---|---|---|---|
| Ex. C | .108 | .134 | 0.3 |
| Ex. D | .106 | .139 | 0.5 |
| Ex. E | .096 | .136 | 0.2 |
| Ex. F | .105 | .140 | 0.5 |
| Compar. 2 | .103 | .149 | 1.4 |

The Ex. C and Ex. A (see Table 3) samples with a top layer of aramid fibers performed with coefficients dynamic of friction of 0.134 and 0.147, respectively. The higher and more uniform concentration of aramid fibers as shown in Ex. C, provides a lower dynamic coefficient of friction than for the comparative Sample 2. Including silicon nitride particles to the secondary layer formulation slightly increased dynamic friction from 0.134 to 0.139. Tests with silicon nitride and carbon fiber additions performed similarly. Lining wear was low for all of the Examples A, B, C, D, E and F papers.

In the Full Pack test shown in Table 6 below, the Ex. C ran the entire 1050 cycles. All materials had wear.

TABLE 6

Full Pack Laboratory Data
Exxon 1975 Lubrication

| Materials Tested | Dynamic Friction After 1050 Cycles | Average Pack Loss (mils) |
|---|---|---|
| Ex. C | .123 | 37.8 |
| Ex. D | NA (0.112 after 400 cycles | 31.6 |
| Ex. E | NA (0.147 after 50 cycles) | severe damage |
| Ex. F | NA (0.130 after 300 cycles) | 71.3 |
| Compar. 2 | .151 | 24.0 |

It is advantageous to use two-ply friction materials from a cost savings perspective and as a tool for manufacturing customized papers. The saturated two-ply friction materials did not reveal any problems with separation of layers. Two-ply friction materials provide a means for evaluating the friction and wear performance of specific ingredients located in the top layer.

The presence of silicon nitride increases the dynamic coefficient of friction with no increase in assembly wear. The LVFA data indicates that a top layer with formulation #1 performs with less lining wear and lower friction than Compar. 2 material.

EXAMPLE II

Example II shows that the two-ply friction material can be formed with two layers of different compositions which are joined together during the wet paper making process. It is found that the ingredients from each layer intertwine to form a two-ply fibrous base material having sufficient interfacial strength for use as a friction material. The following examples were saturated with a phenolic resin as shown in Table 7 below.

TABLE 7

| | |
|---|---|
| Ex. G | First-Ply of cotton 10%, celite 40% Second-Ply of Formulation #1 (40% Actual Pickup) Primary Basis Wt. = ~160, Secondary Basis Wt. = ~45, Total Basis Wt. = 193–196, Caliper = 0.032" |
| Ex. H | First-Ply of cotton 45%, celite 40%, glass fibers 15% Second-Ply of Formulation #1 (40% Actual Pickup) Primary Basis Wt. = ~160, Secondary Basis Wt. = ~45, Total Basis Wt. = 190–201, Caliper = 0.033–0.035" |
| Ex. I | First-Ply of cotton 60%, celite 40% Second-Ply of Formulation #1 (41% Actual Pickup) Primary Basis Wt. = ~89, Secondary Basis Wt. = ~41, Total Basis Wt. = 130–140, Caliper = 0.0220–0.0235" |
| Compar. 3 | Single-Ply of Formulation #1 (43% Actual Pickup) Total Basis Wt. = 205–225, Caliper = 0.032–0.040" |
| Compar. 4 | Single-Ply of Formulation #1 (35% Actual Pickup) Total Basis Wt. = 135 |
| Compar. 5 | Single-Ply of Formulation #1 (40% Actual Pickup) Total Basis Wt. = 135 |

All test samples were saturated with a phenolic resin to a 40% pick-up level, except where noted. A friction and wear evaluation using a clutch-type assembly was conducted. Full Pack testing was performed according to procedures 528A or 428C. The 528A procedure does not specify the recording of static friction values, according to the 45 degree method defined in drawing #95407. Otherwise, the two full Pack procedures are identical.

Wet and dry tensile tests with raw paper in (a) machine, and (b) cross-machine directions were performed. The cross head speed was set at 0.5 inches per minute, and chart speed to 1 inch per minute.

Capillary flow and liquid permeability tests were performed on the friction material. These measurements reflect the ability of the friction material to contain lubricant and transfer heat.

(A) TWO-PLY VERSUS SINGLE-PLY FRICTION MATERIAL:

Dynamic Friction Evaluation (200 lb. basis weight).
Full Pack Tests #528

Similar friction and wear performance results from tests with single-ply and two-ply assemblies. The dynamic friction averaged about 0.14 after 1050 cycles. Laboratory dynamic friction coefficients are listed in Table 8 below. Percent friction fade, between cycles 200 and 1050, averaged about 8% for all three materials tested. Ex. G which has cotton and celite in the lower layer, had the least percent of dynamic frictional fade (5.3%). Assemblies with glass fibers added to the cotton, and celite lower layer (Ex. H), resulted in slightly higher frictional fade (8.6%). The highest fade was measured with the Compar. 3 sample (10.5%). FIG. 3 illustrates the change in dynamic friction as the number of cycles increase for Compar. 3, Ex. G and Ex. H.

Assembly Pack Wear (200 lb. Basis Weight)
Full Pack Tests #528

As seen in Table 8 below, assemblies with two-ply material had slightly higher lining wear. The Compar. 3, single-ply material, resulted in a +0.7 mils wear value. Wear of the two-ply papers with and without glass fibers (Ex. G and H) in the lower layer are 7.5 mils and 12.0 mils, respectively. Glass fibers in the lower layer stiffened the paper matrix slightly. The amount of friction material removal versus compression is undetermined. However, after testing the single-ply and two-ply assemblies have a similar physical appearance.

Appearance rankings of abrasion, breakout, glazing, and delamination are given in Table 9 below. All three friction materials were given a glazing ranking of "1." Assemblies with Ex. H, which includes glass fibers in the lower layer, resulted in slightly higher surface abrasion.

TABLE 8

Full Pack Laboratory Data/1050 Cycle
Procedure 528/Phenolic Resin 40% P.U.
Exxon 1975 AFT

| Clutch Assembly Material | High Speed Dynamic | Average Peak Loss-Mils |
|---|---|---|
| Compar. 3 | 0.137 | +0.7 |
| Ex. G | 0.144 | 12.0 |
| Ex. H | 0.138 | 7.5 |
| Compar. 4 | 0.135 | Stopped @ Cycle 600 |
| Compar. 5 | 0.133 | Stopped @ Cycle 550 |
| Ex. I | 0.131 | 9.0 |

TABLE 9

Lining Appearance Ranking
100 lb. Basis Wt./After 528 Full Pack Test

| Clutch Assembly Material | Abrasion | Breakout | Glazing | Delamination |
|---|---|---|---|---|
| Compar. 3 | 0 | 0 | 1 | 0 |
| Ex. E | 0 | 0 | 1 | 0 |
| Ex. H | 1 | 0 | 1 | 0 |

(B) HIGH VERSUS LOW BASIS WEIGHT MATERIAL.

Figure 4:
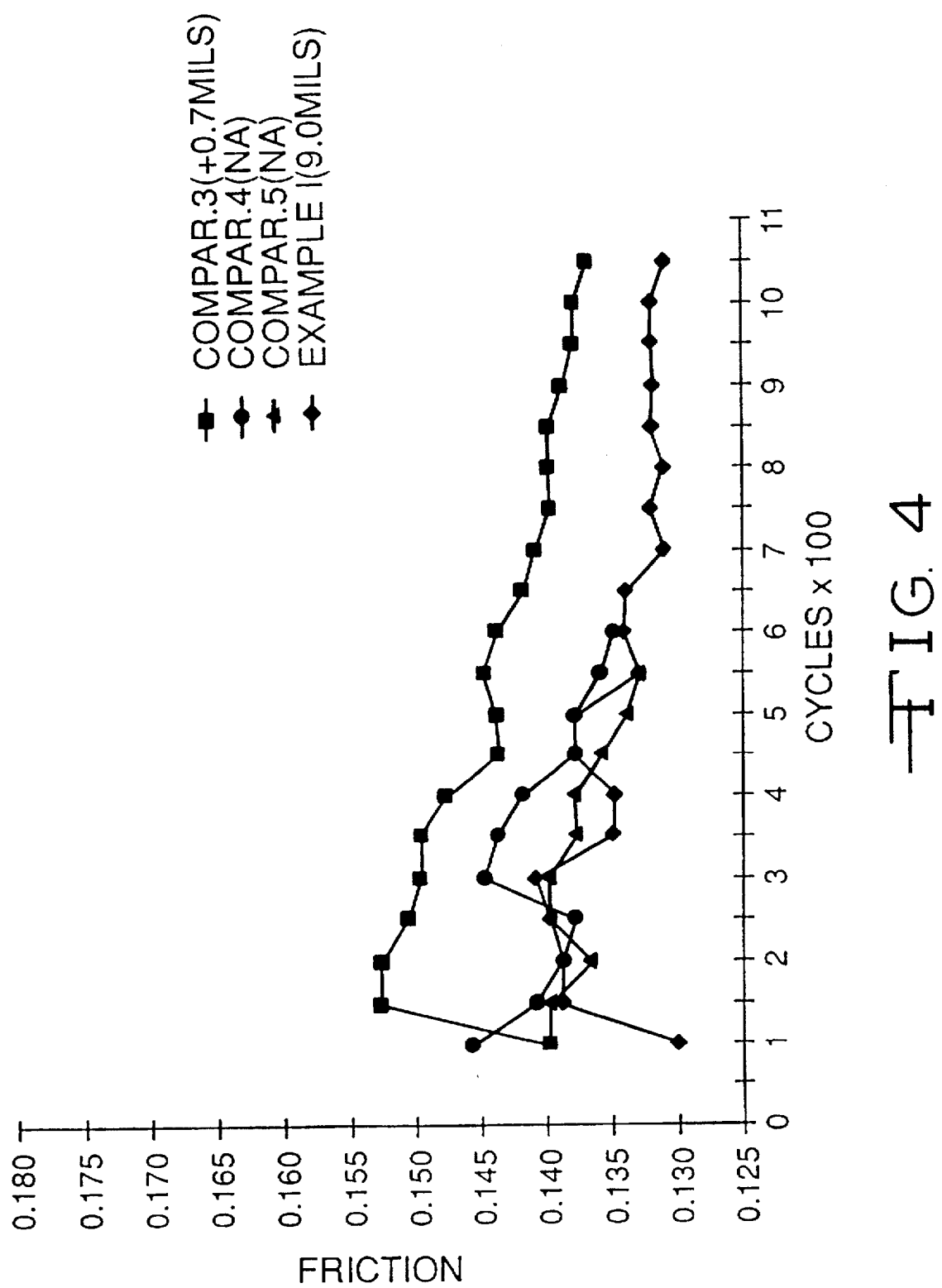
FIG. 4 is a graph comparing the dynamic coefficient of friction as the number of cycles increases for comparative Samples 3, 4 and 5 and Example I.

Lower Basis Weight Paper (135 lb. basis weight) As seen in Table 8 above, tests with a single-ply friction materials at a lower 135 lb. basis weight (Compar. 4 and Compar. 5), were discontinued after 600 cycles of a test run according to the 528 procedure. Lower basis weight paper at 35% and 40% resin pick-up levels were stopped because of erratic friction coefficients. FIG. 4 illustrates the friction versus number of cycles performance variation of 200 lb. and 135 lb. basis weight friction materials for Compar. 3, Compar. 4, Compar. 5 and Ex. I.

Two-ply friction material was also made at a 135 lb. basis weight. This material has Formulation #1 in the top layer, and a lower layer of cotton and celite (Ex. I). This material was able to complete the test with a 0.131 dynamic friction coefficient and 9 mils of wear. The lower basis weight friction material performed with lower dynamic friction coefficients.

The density of both 135 lb. and 200 lb. basis weight materials were calculated using the equation below. High and low basis weight materials were made into assemblies with a final density of 43.

$$D = BW * 1/FLT * (1 + PU) * 0.004$$

where D=Density of Lining
BW=Basis Weight of raw material in lb./3000 sq.ft.
FLT=Final Lining Thickness in inches (after being saturated, cured, and compressed)
PU=Resin Pick-up (C) PAPER CAPILLARY FLOW.

All the friction materials have mean pore size diameters that increase after the raw paper is resin saturated and cured, see Table 10 below. The two-ply materials have large larger mean pore size diameters than singly-ply materials. This larger mean pore size diameter helps to increase lubricant availability at the contact area.

Higher 200 lb. basis weight material, when raw or resin saturated and cured, has a relatively larger mean pore size diameter compared to the same material at a lower 135 lb. basis weight. The raw 200 lb. basis weight Compar. 3 material has a 3.0016 micron mean pore diameter. When the basis weight is reduced to 135 lb. material (Compar. 4), the mean pore size is reduced to 2.6170 microns. However, once compressed both basis weight materials have similar 2.45 micron mean pore size diameters.

Two-ply materials with and without glass fibers in the lower layer (Ex. G and H, respectively) consistently have larger mean pore size diameters than the single-ply materials. Altering the glass fiber concentration in the lower layer composition does not have an influence on pore diameter. However, the various placement of two layers together with different mean pore size diameters individually, is an effective method of altering the combined two-ply mean pore size.

Data for capillary flow shows mean pore size diameter increases (a) when material is saturated with resin and cured, and (b) when two-ply material is used compared to single-ply material. Mean pore size decreases when material is compressed after being saturated with resin and cured.

TABLE 10

Capillary Flow Analysis
Five Measurements Per Friction Material
Mean Pore Size: A) raw paper, B) saturated (40%) and cured paper,
C) saturated (40%), cured and compressed paper

| Raw Friction Material | Pore Size Microns | Standard Deviation |
|---|---|---|
| Compar. 3 | A) 3.0016 | 0.2934 |
| | B) 4.0862 | 0.1044 |
| | C) 2.4433 | 0.0746 |
| Ex. G | A) 4.0160 | 0.3143 |
| | B) 4.6143 | 0.1758 |
| | C) | |
| Ex. H | A) 3.5953 | 0.2565 |
| | B) 5.0581 | 0.2441 |
| | C) 2.8218 | 0.1717 |
| Compar. 4 | A) 2.6170 | 0.2781 |
| | B) 3.5227 (35% PU) | 0.5261 |
| | C) 3.2854 (44% PU) | 0.1513 |
| | D) 2.4645 (44% PU) | 0.1246 |
| Ex. I | A) 3.0512 | 0.1510 |
| | B) 3.7970 | 0.2665 |
| | C) 2.7396 | 0.3655 |

(D) LOWER LAYER WITH AND WITHOUT GLASS FIBERS.

Compression Set Test

Compression set tests were performed to verify the presence of a "k" factor in the experimental materials. The "k"

factor is a force constant defined in the equation F(x)=−kx, wherein x is the distance a spring is compressed or extending. D. Halliday and R. Resnick, "Fundamentals of Physics," John Wiley and Sons, Inc., 1974. Using glass fibers in the lower layer composition alters the "k" factor of a two-ply material.

Tensile Tests on Raw Paper—Instron

Dry and wet tensile strength of a friction material is important during handling and resin saturating. Low tensile strength friction material will shred in the resin saturation bath. Table 11 below shows the relative strength of single-ply and two-ply material. A 30%–40% tensile strength loss is measured when the friction material is wet with alcohol.

The 200 lb. basis weight Compar. 3 friction material is 50% higher in machine and X-machine direction tensile strength than 135 lb. basis weight material. Two-ply 200 lb. basis weight material with cotton and celite in the lower layer (Ex. G) has tensile strength similar to the single-ply production material.

When two-ply material has glass fibers included into the lower layer (Ex. H), tensile strength is reduced by 40%. This material has a substantially lower tensile strength (66%) in X-machine direction compared to the machine direction.

TABLE 11

| Raw Friction Material | Instron Tensile Test Data/Raw Paper Five Value Average - Dry & Wet Tests | | | |
|---|---|---|---|---|
| | Tensile Strength (lbs.) | | Std. Dev. | |
| | Dry | Wet | Dry | Wet |
| Compar. 3 | | | | |
| Machine Direction | 8.21 | 4.97 | 0.40 | 0.15 |
| X-Machine Direction | 5.48 | 3.43 | 0.20 | 0.16 |
| Ex. G | | | | |
| Machine Direction | 7.84 | 4.90 | 0.88 | 0.50 |
| X-Machine Direction | 4.90 | 2.80 | 0.35 | 0.12 |
| Ex. H | | | | |
| Machine Direction | 5.15 | 2.90 | 0.65 | 0.37 |
| X-Machine Direction | 1.73 | 2.34 | 0.24 | 0.46 |
| Compar. 4 | | | | |
| Machine Direction | 4.16 | 2.72 | 0.36 | 0.13 |
| X-Machine Direction | 2.83 | 1.95 | 0.43 | 0.14 |

(E) PLY ADHESION OF THE RAW PAPER.

Ply adhesion of a two-ply paper is defined as the resistance of layers to splitting when a force is applied at right angles to the faces of the sheet. This parameter is specifically useful for the ranking of raw friction materials. Ply adhesion can be increased through saturating a sheet with almost any polymeric material. Three factors can effect the ply adhesion of latex saturated papers: (1) the quantity and kind of polymer in the sheet, (2) the adhesion of the polymer to the fibers, and (3) the arrangement of the fibers in the sheet. The latex can provide additional ply adhesion to the two-ply material until the phenolic resin has been cured.

The above Example II shows that single-ply and two-ply materials resulted in similar Full Pack frictional performance. However, lower basis weight friction materials result in lower dynamic friction coefficients.

When basis weight of a friction material is lowered the lining durability is reduced. Two-ply material is more durable than single-ply material when tested at the lower basis weight.

The mean pore size diameter is altered when friction material composition is changed. Changing composition of the primary layer in a two-ply material increases pore size and improves clutch assembly lubrication.

The cost savings result from using two-ply material as compared to single-ply material. More exotic and expensive materials can be used in the secondary layer which, in preferred embodiments, can be relatively thin. Ingredients that significantly improve clutch friction and/or wear performance can be concentrated in the secondary layer.

EXAMPLE III

Materials with a high energy capacity are required in some clutch applications. Typically, high friction coefficient is not as important as a high thermal resistance from such material. The energy capacity of the friction materials can be increased by utilizing an elastomeric particle in the formulations. Further, the use of the two-ply friction material with silicone as a saturated resin increases the friction coefficient and reduces wear. The comparative examples and Ex. I formulations are shown in Table 12 below.

TABLE 12

| Compar. 6 | One-Ply of Formulation #2: cotton 46%, celite 17%, aramid fiber 6%, silicon nitride particles 6%; Friction particles: nitrile rubber type elastomeric polymer 5%, CNSL-5%, very hard CNSL-15%, Latex 2% processing aid Total Basis Wt. 133–135, Caliper = 0.025" |
|---|---|
| Compar. 6a | Saturated with 43% Phenolic |
| Compar. 6b | Saturated with 35% Phenolic |
| Compar. 7 | One-Ply Formulation #1A: Same as Formulation 1, except including nitrile type elastomeric friction particles, rather than isoprene type particles Total Basis Wt. ~135, Caliper = 0.021–0.022" |
| Compar. 7a | Saturated with 45% Phenolic |
| Compar. 7b | Saturated with 34% Phenolic |
| Compar. 7c | Saturated with 47% Silicone |
| Ex. I | First-Ply cotton 60% celite 40% Second-Ply of Formulation #1 Total Basis Wt. 130–140, Caliper = 0.022–0.0235" |
| Ex. Ia | Saturated with 56% Silicone |
| Ex. Ib | Saturated with 43% Silicone |
| Compar. 3 | One-Ply of Formulation #1 Total Basis Wt. 135, Caliper 0.021–0.023" |

Compar. 7 formulations were saturated with phenolic resin (Compar. 7a, 7b) and a silicone resin (Compar. 7c) separately. Compar. 3 and Ex. Ia and Ib were saturated with a silicone resin.

High energy friction material Compar. 6 that contains three different types of friction particles was made. This material was saturated with phenolic resin.

All materials were 135 lb. basis weight and used for making clutch assemblies. The assemblies were evaluated for friction and wear characteristics according to procedures 528C or 527C.

Full Pack Test - Moderate Energy Procedures 528C (A) Phenolic Resin

When the one-ply material is made with the nitrile friction particle replacing the isoprene friction particle (as in Compar. 7), the durability is slightly increased. The Compar. 3 material (with the isoprene particle) at 35% pick-up lasted 600 cycles, while the Compar. 7 material at the same pick-up lasted 850 cycles. A summary of the friction and wear data is given in Table 13 below. Surface appearance data and percent dynamic friction data can be found in Table 14 below.

TABLE 13

Full Pack Test - Laboratory Data at Cycle 1050
Procedure 528C - 135 lb. Basis Weight Material
Exxon 1975 Type "H" Lubrication

| Friction Material | Low Speed Dyn.* | High Speed Dyn.** | Pack Loss Mils |
|---|---|---|---|
| Compar. 6a | 0.138 | 0.146 | 7.0 |
| Compar. 6b | NA | 0.132 | 36.0 |
| Compar. 7a | 0.125 | 0.123 | 4.0 |
| Compar. 7b | NA | 0.133 @ cycle 850 | 12.0 @ cycle 850 |
| Compar. 7c | 0.142 | 0.151 | 0.0 |
| Ex. Ia | 0.162 | 0.175 | 5.0 |
| Ex. Ib | 0.159 | 0.172 | 6.0 |
| Compar. 3 - Silicone 45% | 0.147 | 0.155 | 0.0 |
| Compar. 3 - Phenolic 40% | NA | 0.133 @ cycle 550 | stopped |
| Compar. 3 - Phenolic 35% | NA | 0.135 @ cycle 600 | stopped |
| Ex. I - Phenolic 41% | NA | 0.131 | 9.0 |

*Low speed dynamic (static) recorded according to the 45 degree method described in drawing #95407
**High speed dynamic recorded 0.2 seconds after engagement

TABLE 14

Full Pack Test - Pack Surface Appearance Data
Procedure 528C - 135 lb. Basis Weight Material
Exxon 1975 Type "H" Lubrication

| Friction Material | Abrasion | Breakout | Glazing | Delamination | % Fade** |
|---|---|---|---|---|---|
| Compar. 6b | 2 | 0 | 2 | 0 | 0.0 |
| Compar. 6a | 5 | 0 | 3 | 0 | 13.7 |
| Compar. 7a | 2 | 1 | 2 | 0 | 8.1 |
| Compar. 7b | 4 @ cycle 850 | 0 @ cycle 850 | 4 @ cycle 850 | 0 @ cycle 850 | NA |
| Compar. 7c | 0 | 0 | 1 | 0 | 16.1 |
| Ex. Ia | 0 | 0 | 1 | 0 | 8.4 |
| Ex. Ib | 0 | 0 | 1 | 0 | 8.0 |
| Comp. 3 | 0 | 0 | 1 | 0 | 10.4 |
| Compar. 3 Phenolic 44% | 4 @ cycle 650 | 0 @ cycle 650 | 2 @ cycle 650 | 0 @ cycle 650 | NA |
| Compar. 3 Phenolic 35% | 5 @ cycle 650 | 0 @ cycle 650 | 3 @ cycle 650 | 0 @ cycle 650 | NA |
| Ex. I Phenolic 41% | 1 | 0 | 3 | 0 | 5.8 |

**Percent high speed dynamic friction face from cycle 200 to 1050

Assemblies made with Compar. 7 material at a higher 45% pick-up level, were able to successfully complete the 528C type test. This material, which includes the nitrile type elastomeric friction particle, had a final dynamic friction of 0.123 and only 4.0 mils pack loss. The Compar. 7 material tested with a 8.1% dynamic friction fade. Abrasion and glazing were ranked "2", while breakout was "1", and delamination a "0". In comparison, the one-ply material (Compar. 3) with a 44% phenolic resin pick-up was stopped after 550 cycles. There is essentially no improvement when resin pick-up goes from 35% to 44% with one-ply material. Exchanging the isoprene elastomeric friction particle with the nitrile elastomeric friction particle in the formulation #1A, and increasing resin pick-up, gives the material additional energy capacity.

The Compar. 7 material was saturated with silicone resin at a 47% pick-up level. This material had a final dynamic friction coefficient of 0.151, with 16.1% dynamic friction fade. The pack loss was 0.0 mils. Surface appearance was excellent after testing. The abrasion, breakout, and delamination were all ranked "0", while the glazing was "1". Using silicone resin in conjunction with nitrile elastomeric friction particle in the formulation #1 A increases lining wear resistance, friction coefficient, and improves assembly surface appearance rankings.

Single-ply material (Compar. 3) at 135 lb. basis weight was unable to successfully complete the 528C test with 40% or 35% phenolic resin pick-up, as seen Table 13 above. These tests were stopped after roughly 600 cycles.

However, the two-ply material with formulation #1 as the top layer (Ex. I), and 41% phenolic resin pickup, was able to successfully complete the test with a final dynamic friction coefficient of 0.131, 5.8% friction fade, and 9.0 mils of pack loss, as seen Table 13 above.

When the single-ply material (Compar. 3) is saturated with silicone resin at 45% pick-up, the final dynamic friction increases to 0.155 with a 10.4% friction fade, and 0 mils pack loss, as seen Table 13 above. Assembly surface glazing was ranked "1" and abrasion, breakout, and delamination all ranked "0". The use of the silicone resin has improved the friction and wear performance of one-ply friction material under these test conditions.

The two-ply material (Ex. I) which has Formulation #1 on the top was saturated with a silicone resin at 43% and 56% pick-up levels. Both tests had a final dynamic friction level of roughly 0.174 with about 5.5 mils of pack loss and 8.2% friction fade. Surface condition of the lining was excellent after testing. Only glazing was ranked "1", abrasion, breakout, and delamination were all ranked "0." The two-ply material resulted in high friction than the single-ply material. Again, the Formulation #1 material with the silicone performed with higher friction than the phenolic resin saturated material.

Figure 5:
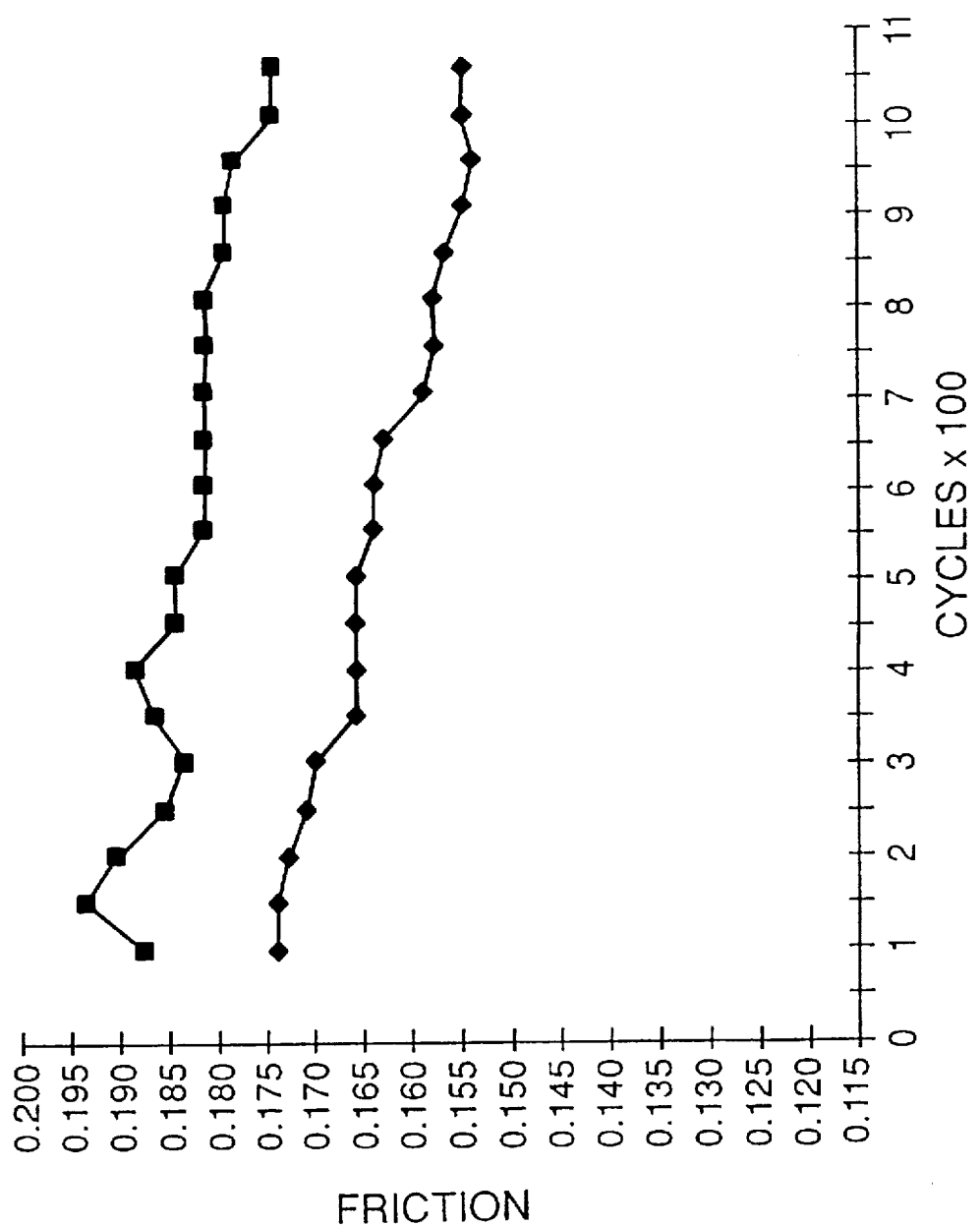
FIG. 5 is a graph comparing the dynamic coefficient of friction as the number of cycles increases for comparative Sample 3 and Example I.

FIG. 5 shows the number of cycles versus friction curves for formulation material with the alterations made for increasing durability and friction for the Compar. 3 and Ex. I. The differences in the curves show the effect of the elastomeric 4198 particle, the silicone resin, and the two-ply material.

EXAMPLE IV

A variation in friction material density influences the friction and wear performance of an assembly. The single-ply material and two-ply materials with different density combinations have been evaluated. Two-ply material density combinations evaluated were primary and secondary layers having the same density (Ex. J), primary layer having a high density and secondary layer having a low density (Ex. K), and primary layer having a low density and secondary layer having a high density (Ex. L), as seen in Table 15 below.

The same material formulation was used for both the primary (bottom) and secondary (top) layers of the two-ply friction material. However, the examples which comprise high density layers contain more "mechanically" refined cotton material. The refining of the cotton fibers increases the fibrillation of the fibers and lowers the Canadian Standard Freeness Number (CFN). The CFN (as tested by the T227om-94 Test Method approved by the TAPPI) becomes low as the amount of refining or fibrillation of the fiber material increases. The density increases as the amount of fibrillation increases (i.e., as the CFN decreases). It is to be understood that "normal" or standard cotton fibers have an average CFN of about 550, while extra "refined" cotton fibers have an average CFN of about 450. Thus, the standard cotton fibers (about 550 CFN) produce relatively low density sheets or layers of fibrous base material while the refined cotton fibers (about 450 CFN) produce relatively high density sheets or layers of fibrous base material.

In all cases, the total paper basis weight was targeted to about 200 lbs., of which the primary and secondary layers were 160 lbs. and 40 lbs., respectively. A phenolic saturating resin was used to obtain a 50–55% pick-up. All the tests were run according to procedure 498 with Exxon 1975 Type "H" lubrication.

The friction materials below contain Formulation #3: cotton 36.8%, aramid pulp 4.8%, celite 13.6%, silicon nitride particles 4.8%, friction particles: nitrile, elastomeric polymer particles: 4.0%, CNSL 4.0%, very hard CNSL 12.0%; novoloid fibers: 3 mm length 10%, 0.20 mm length 10%.

The porosity data listed in Table 15 below was a measure of the length of time required to pass a specific volume of air through a sheet of paper using a Gurley Densometer.

The Mullen's data presented in Table 15 below is a test method which measures the bursting strength of paper when pressure is applied at a constant rate to a liquid controlled by a rubber diaphragm under a standard orifice covered by a test specimen. This test method is an extrapolation of TAPPI Method T-403.

TABLE 15

| | Dry Tensile | Wet Tensile | Porosity | Mullen | Raw Density | Saturated Density |
|---|---|---|---|---|---|---|
| Ex. J - Total (primary and secondary layer) Basis Wt. = 201, Caliper = 0.0385" | 6000 | 5000 | 3 | 12 | 20.88 | 42.9 |
| Primary Layer: Basis Wt. = 159.5 Caliper = 0.0325" | 5500 | 4000 | 2 | 9 | 19.63 | |
| Ex. K - Total (primary and secondary layer) Basis Wt. = 196, Caliper = 0.032" | 5800 | 4700 | 3 | 12 | 24.5 | 48.5 |
| Primary Layer: Basis Wt. = 155.5, Caliper = 0.0285" | 5000 | 4000 | 2 | 9 | 21.83 | |
| Ex. L - Total (primary and secondary layer) Basis Wt. = 204, Caliper = 0.0385" | 6900 | 5800 | 4 | 14 | 21.1 | 42.9 |
| Primary Layer: Basis Wt. = 164, Caliper = 0.032" | 5800 | 4500 | 3 | 11 | 20.5 | |

Figure 6:
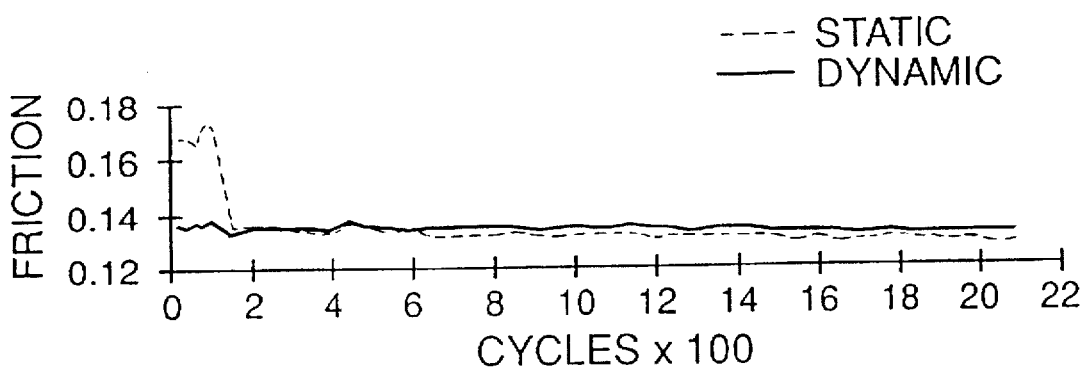
FIG. 6 is a graph comparing the static and dynamic coefficients of friction as the number of cycles increases for Example J.

The two-ply material, with the same density and material formulation in both layers, results with similar dynamic friction magnitude at both 2000 rpm (from 0 to 100 cycles) and 4800 rpm (from 101–2100 cycles) engagement speeds (Ex. J). FIG. 6 illustrates the friction versus number of cycle curves from tests with two-ply assemblies for Ex. J. The total pack loss was 2.8 mils.

Figure 7:
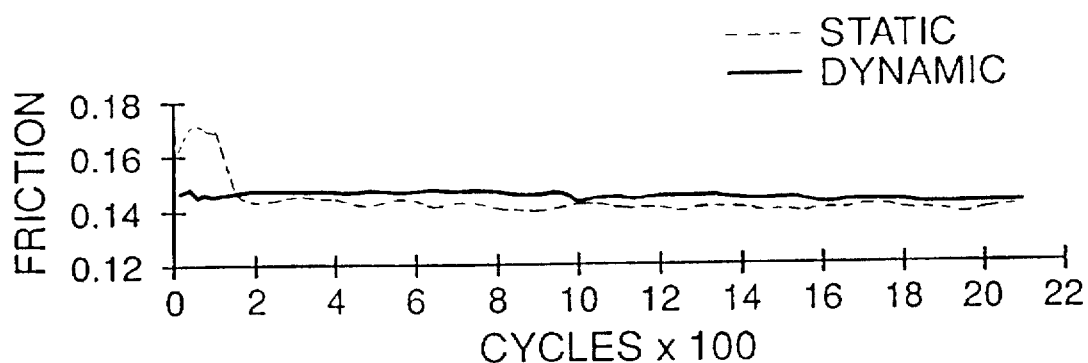
FIG. 7 is a graph comparing the static and dynamic coefficients of friction as the number of cycles increases for Example K.
Figure 8:
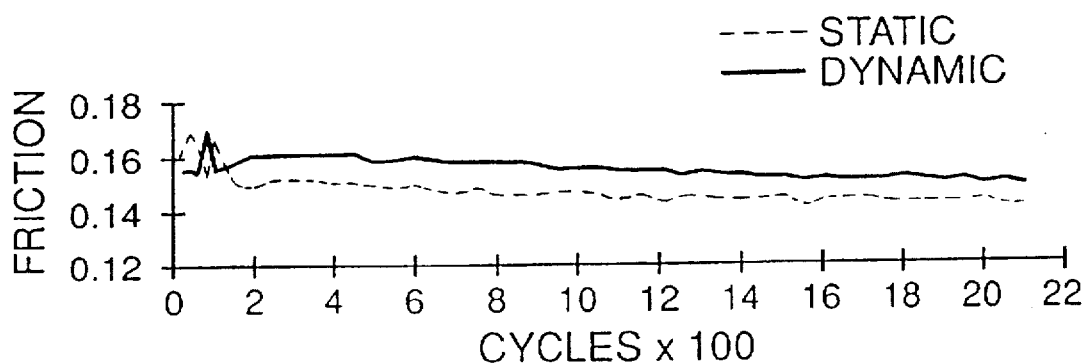
FIG. 8 is a graph comparing the static and dynamic coefficients of friction as the number of cycles increases for Example L.

FIGS. 7 and 8 show two-ply material having density variations. FIG. 7 shows the static and dynamic coefficients of friction for Ex. K. The total pack loss was 0.2 mils.

FIG. 8 shows the static and dynamic coefficients of friction for Ex. L. The total pack loss was 2.2 mils. Altering the density of either the primary or secondary layer of two-ply material changes the friction and wear performance. The most favorable performance, as shown by the porosity data, resulted with the primary and secondary layers of low and high density, respectively (Ex. L) as shown in FIG. 8.

Ex. L shows improved static and dynamic friction coefficients during the 2000 rpm engagements and slightly higher friction coefficients. Assembly wear resistance is also very good with this material. FIGS. 6–8 illustrate the friction versus number of cycle curves the three two-ply material density combinations evaluated (Ex. J, K and L).

Two-ply materials perform better than single-ply materials. The best two-ply material has a low primary layer and a high density secondary layer combination. The two-ply materials exhibited slightly more wear resistance than single-ply material. The dynamic friction coefficients from tests with two-ply materials were less fluctuating at different engagement speeds compared to those from the single-ply material.

EXAMPLE V

The friction and wear tests were performed according to Procedure 5004A with Exxon 1975 Type "H" ATF. All results were obtained using the one-ply friction material or a two-ply friction material. Selected modified and unmodified silicone resins were evaluated with these two friction materials. The materials tested are shown in Table 16 below. Both Ex. M and N contain Formulation #4 as follows: aramid pulp—32%, celite—26%, silica —16%, friction particles: nitrile type elastomeric particles—16%, glass fibers 10%.

TABLE 16

| Ex. M | Single-ply of Formulation #4 Basis Wt. 115–125 |
|---|---|
| Ex. N | Two-ply of Formulation #4 Basis Wt. 115–125 Primary Layer Basis Wt. 80 - low density Secondary Layer Basis Wt. 40 - high density |

Samples saturated with the modified silicone resins have almost twice the shear strength compared to samples saturated with an unmodified silicone resin. Samples saturated with the modified silicone resins increase if mixed with a phenolic or other "brittle" type resin.

Even though the modified silicone resins have higher shear strength than the unmodified resins, they result in similar or slightly higher set values than the unmodified silicone resins. There appears to be little correlation between high shear strength and high unmodified silicone compression set resistance with these friction material formulations. Mean pore size diameter tends to be slightly larger in samples saturated with low cross-linked resins compared to the high cross-linked resins.

Impressive friction and wear performance was exhibited with a two-ply material which had been saturated with a silicone resin subjected to a 450° F. cure. This material had only 0.8 mils pack loss and 9% fiction fade. However, the same material cured at 400° F. tested with 21.0 mils of pack wear and 13% friction fade. Thus, when silicone resin was used there was better pack loss performance and friction performance, which reflects the proper curing of the resin.

Figure 9:
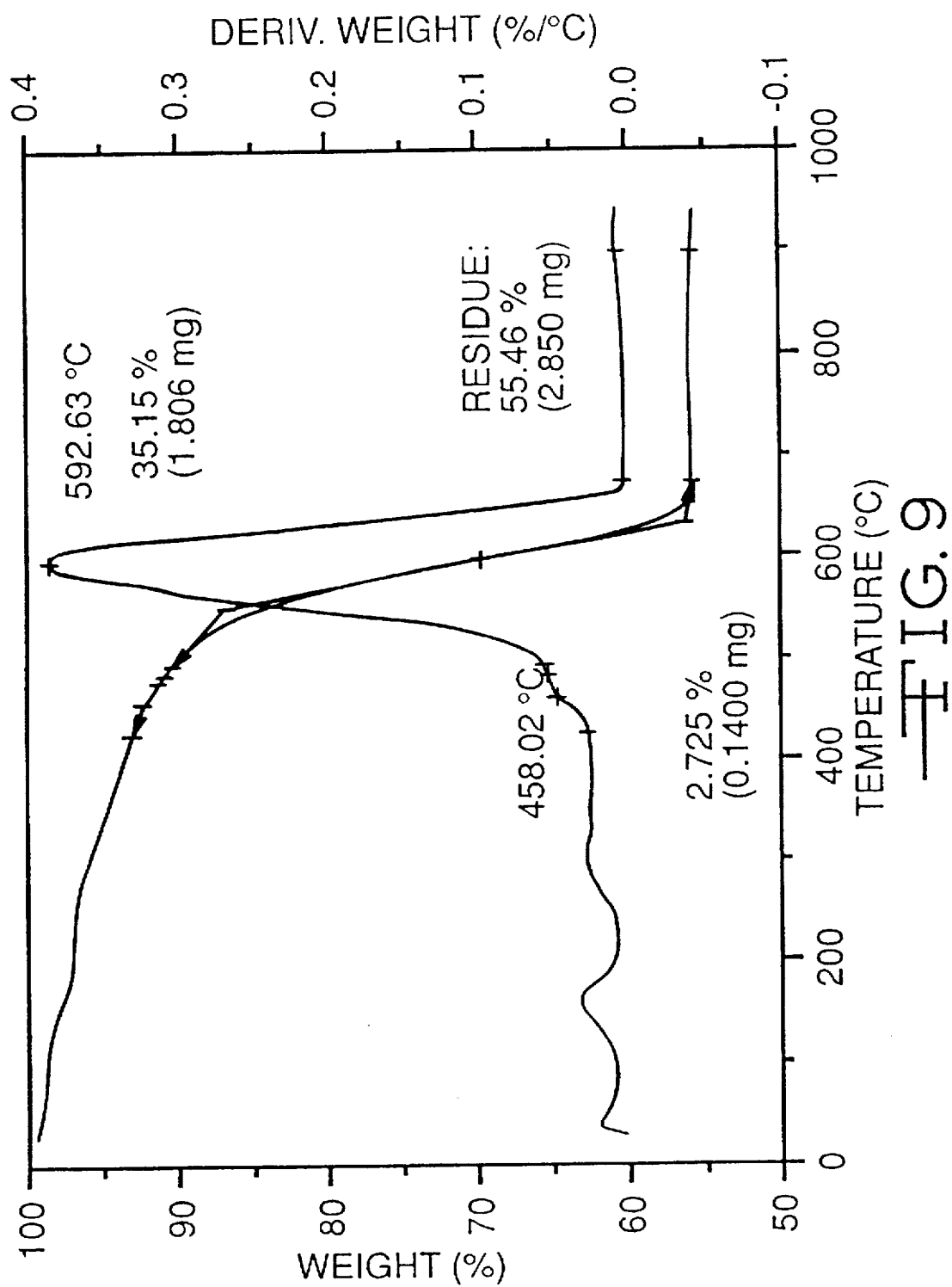
FIG. 9 is a TGA graph showing the percent of weight loss as temperature increase, the change in the derivative weight (%/° C.), and the amount and percent of residue for Example N.

A two-ply fibrous base material was saturated with the different silicone resins listed below. The material has its first TGA peak at approximately 592° C., and a 55.46 weight percent residue as seen in FIG. 9. All were materials saturated to a 60%–65% weight pickup with the resins as shown in Table 17 below.

Table 17

Resin 1) MTV Silicone Rubber, Resin/Polymer Ratio= 50:50—30 min. @ 400° F.—silicone Resin 2) 30 min. @ 450° F.—modified silicone Wt. Avg. Mol. Wt.=10,000, Degree of Crosslinking=1.3

Resin 3) 30 min. @ 450° F.—modified silicone Wt. Avg. Mol. Wt.=10,000, Degree of Crosslinking=1.4

Resin 4) 30 min. @ 450° F.—20:80—silicone/phenolic blend

Resin 5) MTV Silicone Rubber. Resin/Polymer Ratio= 50:50—30 min. @ 450° F.—silicone Resin 6) 30 min. @ 450° F.—modified silicone Wt. Avg. Mol. Wt.=10,000. Degree of Crosslinking=1.4

Resin 7) 30 min. @ 400° F.—modified silicone Wt. Avg. Mol. Wt.=5000,000. Degree of Crosslinking=1.4

Resin 8) 30 min. @ 450° F.—modified silicone Wt. Avg. Mol. Wt.=5000,000. Degree of Crosslinking=1.4

Resin 9) Silicone Rubber. Resin/Polymer Ratio=70:30

Resin 10) Silicone Rubber. Resin/Polymer Ratio=90:10

Resin 11) Silicone Rubber. Resin/Polymer Ratio=5:95

The physical test data for the high temperature friction materials Example M—a single-ply of formulation #4 and Example N—a two-ply of formulation 4 which were saturated with variations of silicone and a silicone/phenolic blend are shown in Table 18 below.

TABLE 18

MATERIAL PHYSICAL ATTRIBUTES
Silicone Resin Comparison

| Saturating Resin | Shear- lb/in² | Tensile- lb/in (not il/in²) | Compression Relaxation @1500 lb/in² | Mean Pore Diameter- microns |
|---|---|---|---|---|
| Single-Ply Material Ex. M | | | | |
| Resin 1 | 183, 208, 201 | 20, 22, 21 | Comp. = 0.4581", Set = 0.1067" | 3.3378 3.1466 |
| Resin 9 | 226, 236, 234 | 27, 26, 27 | Comp. = 0.4240", Set = 0.1142" | 3.0059 2.9611 |
| Resin 11 | 84, 90, 85 | 11, 10, 10 | Comp. = 0.4792", Set = 0.1718" | 3.5825 3.1183 |

TABLE 18-continued

MATERIAL PHYSICAL ATTRIBUTES
Silicone Resin Comparison

| Saturating Resin | Shear- lb/in² | Tensile- lb/in (not il/in²) | Compression Relaxation @1500 lb/in² | Mean Pore Diameter- microns |
|---|---|---|---|---|
| Two-Ply Material Ex. N | | | | |
| Resin 1 | 172, 162, 146 | 23, 22, 23 | Comp. = 0.3666", Set = 0.0630" | 2.8875 3.3010 |
| Resin 2 | 417, 373, 358 | 45, 45, 44 | Comp. = 0.3449", Set = 0.1081" | 3.7316 3.5069 |
| Resin 3 | 355, 355, 330 | 43, 42, 43 | Comp. = 0.3432", Set = 0.1460" | 2.7773 2.7956 |
| Resin 4 | 406, 442, 412 | 52, 44, 55 | Comp. = 0.2251", Set = 0.0524" | 2.8180 2.3375 |
| Resin 5 | 188, 226, 213 | 28, 29, 29 | Comp. = 0.4181", Set = 0.1056" | 3.2174 2.7459 |
| Resin 6 | 374, 332, 357 | 41, 45, 43 | Comp. = 0.3490", Set = 0.1436" | 2.6725 2.5462 |
| Resin 7 | 379, 401, 388 | 43, 44, 42 | Comp. = 0.3642", Set = 0.1864" | 2.5392 2.8858 |
| Resin 8 | 336, 344, 359 | 41, 43, 42 | Comp. = 0.3878", Set = 0.1919" | 2.9224 2.7483 |

Friction and wear data was performed according to SAE procedure 5004A using Exxon 19875 Type "H" ATF lubrication. A summary of the results are provided in the Table 19 below.

TABLE 19

Test Procedure 5004A - Exxon 1975 Type "H" ATF
Silicone Resin Comparison

| Saturating Resin | A-Cycle 50 ui | A-Cycle 50 uf | B-Cycle 2050 ui | B-Cycle 2050 uf | C-Cycle 2100 ui | C-Cycle 2100 uf | Wear inches |
|---|---|---|---|---|---|---|---|
| Single-Ply Material Ex. M | | | | | | | |
| Resin 1 Ex. M-1 | 0.168 | 0.165 | 0.133 | 0.145 | 0.139 | 0.159 | −0.0024 |
| Fade* | 0.0% | +3.8% | −17.4% | −7.1% | +3.7% | −0.6% | (T136) |
| Resin 9 Ex. M-2 | 0.177 | 0.169 | 0.145 | 0.139 | 0.161 | 0.155 | 0.0012 |
| Fade | −2.2% | +7.0% | −20.8% | −15.2% | −4.6% | −1.3% | (T230) |
| Resin 11 Ex. M-3 | 0.159 | 0.153 | 0.095 @ 550 | 0.147 @ 550 | NA | NA | 0.0276 |
| Fade | −2.5% | +2.0% | −33.1% | −14.5% | | | (T231) |
| Two-Ply Material Ex. N | | | | | | | |
| Resin 1 | 0.187 | 0.174 | 0.168 | 0.152 | 0.178 | 0.161 | 0.0210 |
| Fade | −2.1% | +6.1% | −12.0% | −13.1% | +3.5% | 0.0% | (T225) |
| Resin 2 | 0.166 | 0.155 | 0.144 @ 1650 | 0.127 @ 1650 | NA | NA | 0.0029 |
| Fade | +5.7% | +6.2% | −3.4% | −9.9% | | | (T183) |
| Resin 3 | 0.164 | 0.155 | 0.136 @ 1950 | 0.129 @ 1950 | NA | NA | 0.0132 |
| Fade | +3.8% | +6.9% | −16.6% | −10.4% | | | (T222) |
| Resin 4 | 0.118 | 0.129 | 0.110 | 0.122 | 0.130 | 0.136 | 0.0059 |
| Fade | −2.5% | +2.4% | −16.7% | −4.7% | +2.4% | +0.7% | (T223) |
| Resin 5 | 0.171 | 0.151 | 0.155 | 0.145 | 0.150 | 0.155 | 0.0008 |
| Fade | −2.3% | 0.0% | −9.4% | −7.1% | +4.2% | +2.0% | (T216) |
| Resin 6 | 0.163 | 0.158 | 0.135 @ 1550 | 0.128 @ 1550 | NA | NA | 0.0149 |
| Fade | +5.2% | +12.9% | −19.6% | −13.5% | | | (T224) |
| Resin 7 | 0.164 | 0.155 | 0.108 @ 750 | 0.126 @ 750 | NA | NA | 0.0189 |
| Fade | −7.9% | +4.0% | −28.0% | −16.0% | | | (T185) |
| Resin 8 | 0.171 | 0.161 | 0.122 @ 850 | 0.127 @ 850 | NA | NA | −0.0057 |
| Fade | −1.2% | +3.9% | −26.5% | −21.1% | | | (T226) |

The two-ply material tests were evaluated using different resins, the silicone and silicone/phenolic resin. The silicone material that was cured to 450° F. rather than 400° F. resulted in 0.8 mils pack loss compared to 21.0 mils pack loss with the same material cured to 400° F. The two-ply material saturated with a silicone/phenolic resin mixture resulted in 5.9 mils wear.

Two TMA (Thermal Mechanical Analysis) tests were performed: the first test involved the heating of the materials at 10° C./minute increments to 750° F. (Method "A") while measuring dimensional displacement, the second test involved five thermal cycles from ambient to 500° C. and then a final temperature increase to 750° C. (Method "B").

TABLE 20

MATERIAL THERMAL COMPARISON
Silicone Resin Comparison

| Saturating Resin | TMA-Method "A" 30 C–750 C | | TMA-Method "B" 30 C–500 C, then 750 C | |
|---|---|---|---|---|
| | 1st-Peak | 2nd-Peak | 1st-Peak | 2nd-Peak |
| Single-Ply Material Ex. M | | | | |
| Resin 1 | +44.57 u @ 273.4 C | −23.72 u @ 507.4 C | +43.05 u @ 274.5 C | −14.6 u @ 513.82 |
| Resin 9 | +26.81 u @ 270.0 C | −15.99 u @ 520.1 C | | −40.3 U @ 742.6 C |
| Resin 11 | +40.83 u @ 294.9 C | −10.37 u @ 443.1 C | +53.5 u @ 326.2 C | +583.9 u @ 592.3 C |
| Two-Ply Material Ex. N | | | | |
| Resin 1 | +48.80 u @ 280.7 C | −23.15 u @ 505.98 C | +40.1 u @ 287.9 C | +474.1 u @ 734.3 C |
| Resin 2 | +30.30 u @ 271.4 C | +23.8 u @ 551.8 C | +40.3 u @ 287.7 C | +265.6 u @ 552.0 C |
| Resin 3 | +23.78 u @ 270.1 C | | +12.8 u @ 266.2 C | +12.8 u @ 555.5 C |
| Resin 4 | +22.62 u @ 282.2 C | −44.22 u @ 491.1 C | | +540.2 u @ 576.7 C |
| Resin 5 | +44.69 u @ 287.9 C | −12.24 u @ 487.9 C | +29.2 u @ 291.2 C | −24.9 u @ 503.7 C |
| Resin 6 | +23.61 u @ 275.4 C | | +19.9 u @ 271.7 C | −18.6 u @ 598.5 C |
| Resin 7 | +2.73 u @ 257.6 C | −20.89 u @ 427.2 C | −63.5 u @ 619.0 C | +248.0 u @ 740.5 C |
| Resin 8 | −7.86 u @ 257.6 C | −43.47 u @ 491.6 C | +14.9 u @ 287.2 C | +458.4 u @ 739.0 C |

*Level A: ui = friction at 3600 rpm, um = 1850 rpm, uf = 740 rpm, and us = 0.72 rpm.
Level B: ui = friction at 3600 rpm, um = 1850 rpm, uf = 740 rpm, and us = 0.72 rpm.
Level C: ui = friction at 3600 rpm, um = 1800 rpm, uf = 740 rpm, and us = 0.72 rpm.

FIG. 9 shows a Thermalgavimetric analysis (TGA) of the Example N. The TGA curve shows a higher temperatures which indicates increase heat resistance. The percent change in weight was 35.15%. The less rapid the weight loss, the more heat resistance the friction material possesses.

EXAMPLE VI

A high performance two-ply paper composite wet clutch facing friction material comprises a secondary layer which comprises a high temperature, high energy, low compression set material formulation, and a primary layer which contains a non-linear elastic, porous formulation.

The two-ply composite material is highly porous, non-linearly elastic and has a low compression set. Friction materials, including for example, two-ply composite wet clutch facings show substantial improvement in friction performance over a single-ply material of the secondary layer material when used along.

The secondary layer comprises Formulation #5 which contains about 10% to about 40% porous activated carbon particles, about 10% to about 30% cotton fibers, about 5% to about 30% precision cut aramid fibers, about 0–20% synthetic graphite and about 0–40% fillers. The primary layer comprises Formulation #6 which contains about 5% to about 30% non-linear elastic PET fibers, about 20% to about 60% cotton fibers, about 10% to about 40% fillers. In a preferred embodiment, the primary layer comprises about 55% cotton, about 10% non-linear elastic PET fibers; 35% celite, and about 2% latex, processing aids, and the secondary layer comprises about 30% activated carbon particles, about 25% cotton, about 10% aramid fiber, about 10% aramid pulp, about 25% celite, and about 2% latex processing aids. The secondary layer comprises about 5% to about 30% and most preferably about 20% of the total thickness of the two-ply composite material. The resulting two-ply composite material is highly porous and non-linearly elastic. The two-ply composite material when used in wet clutch facings shows substantial improvement in friction performance over a single-ply layer high temperature material.

TABLE 21

| Compar. 8 | Formulation #5 |
|---|---|
| | 45% phenolic resin PU |
| | Final density 47.4 lb/cu ft. |
| Compar. 9 | Formulation #6 |
| Ex. O | Secondary layer of Formulation #5 |
| | Primary layer of Formulation #6 |
| | 44% phenolic resin PU |
| | Final density 44.4 lb/cu ft |

The samples where saturated with a phenolic resin at the noted pick-up levels. The data shown in Table 22 shows the average pore diameter in microns for the Compar. 8, Compar. 9 and Example O. It is seen that the Example O two-ply material has an average pore diameter which is greater than either the Compar. 8 or 9. All samples are cured and compressed to a final density of 45–47 lb/cu. ft.

TABLE 22

| | Aver. Pore Diameter (microns) |
|---|---|
| Compar. 8 | 2.599 |
| Compar. 9 | 3.845 |
| Ex. O | 3.894 |

The compression-relaxation tests were conducted using the Compar. 8, Compar. 9 and Ex. O. Compressibility is the measure of a materials' ability to return to its original size after being compressed.

Figure 13:
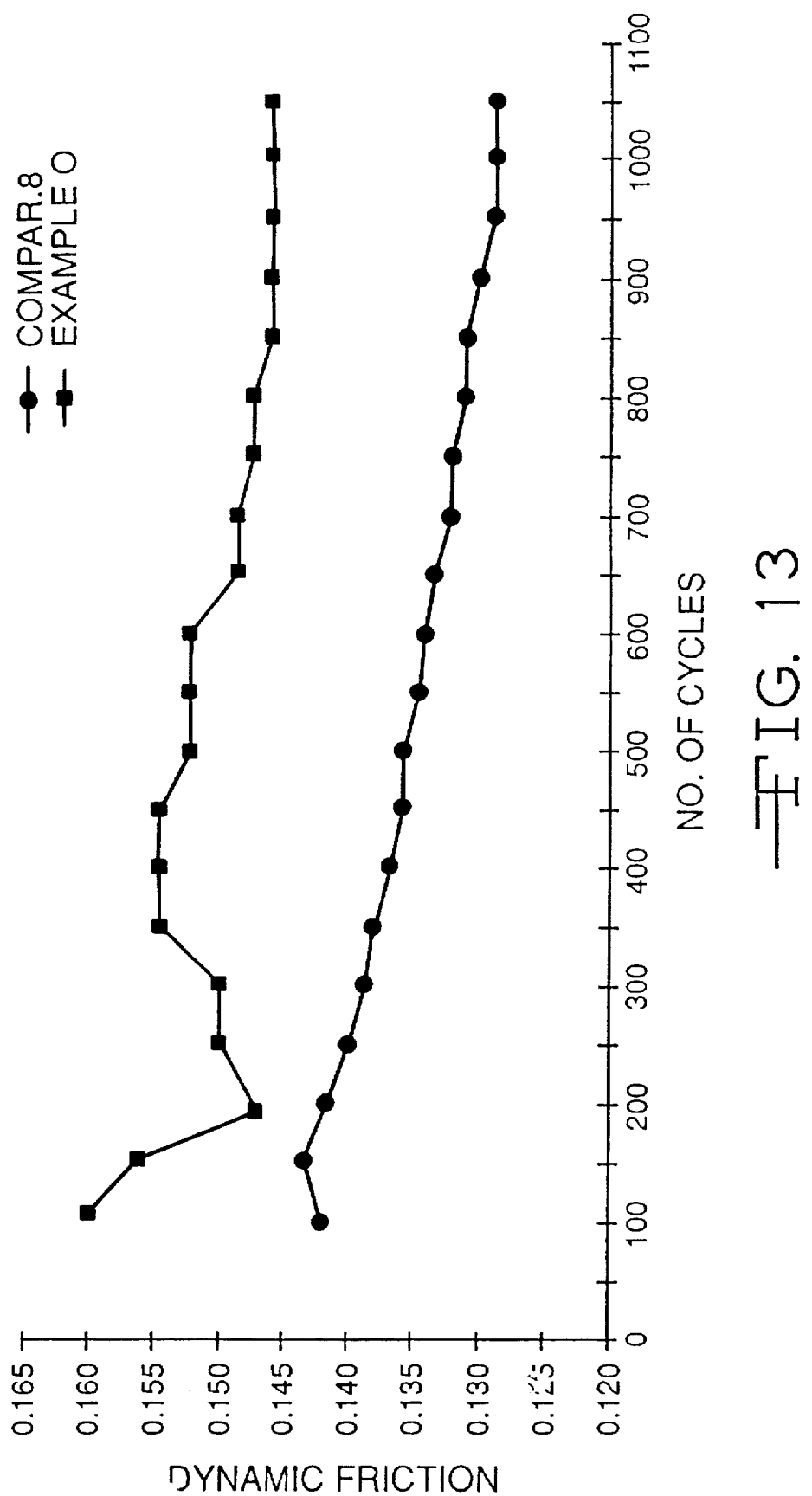
FIG. 13 is a graph comparing the coefficient of friction as the number of cycles increases for comparative example 8 and example N.

The high speed dynamic coefficient of friction versus cycle data, for the Compar. 8 and Ex. O using a full, pack test (527C) high energy test are shown in FIG. 13.

The two-ply friction material is highly porous and non-linearelastic. There is a substantial improvement in friction performance over the single ply of the Compar. 8 or 9. There is a 10 to 25% increase in dynamic coefficient of friction and about a 20 to 50% increase in wear resistance.

In addition there is an increase in heat resistance and there is a lower static/dynamic ratio. The two-ply friction material has an increased pore size, a low compression-relaxation behavior, and an overall increase in resin pickup over the one-ply materials.

Figure 10:
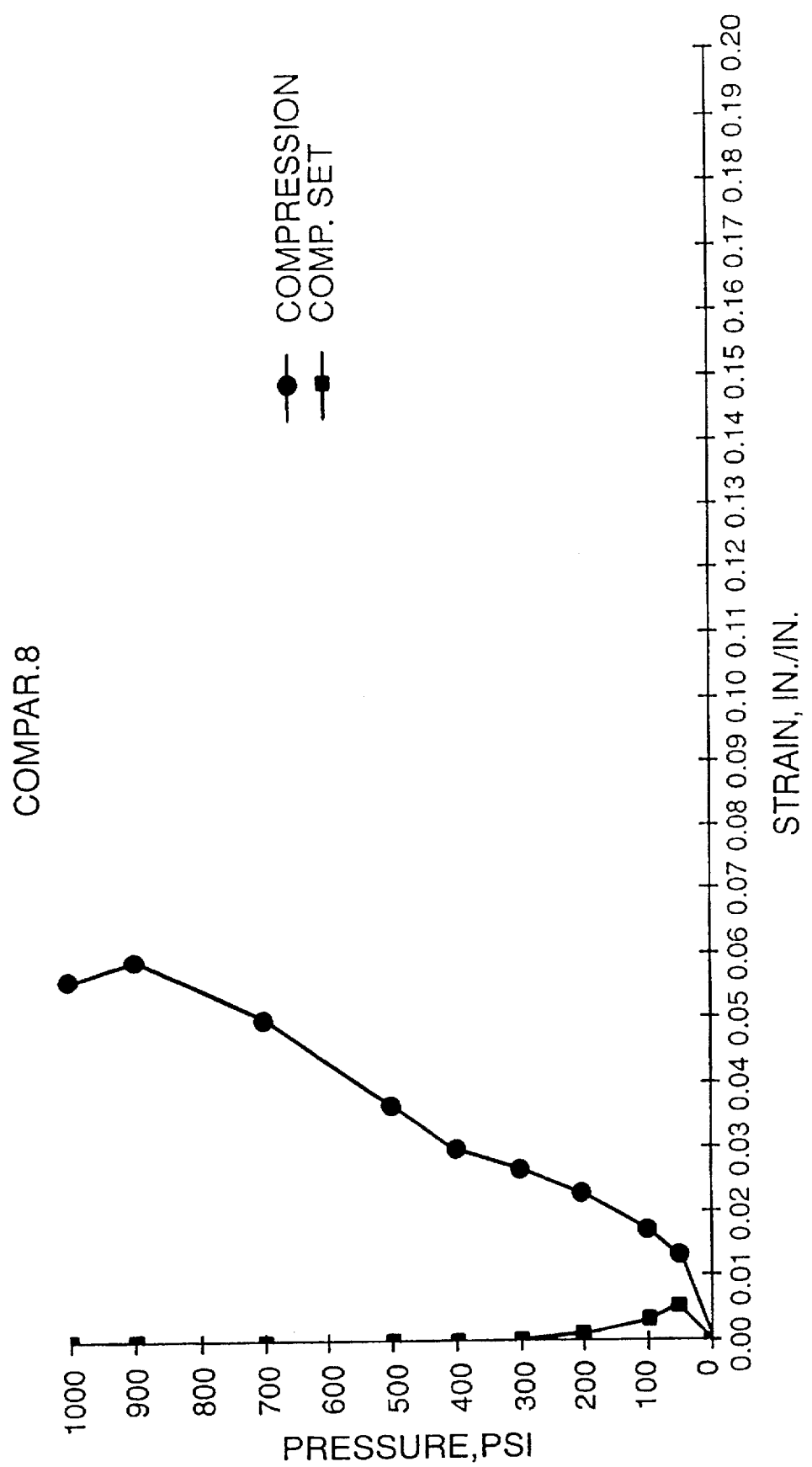
FIG. 10 is a graph showing the compression and permanent set for a noncompressed friction material comprising comparative example 8 impregnated with a phenolic resin.
Figure 11:
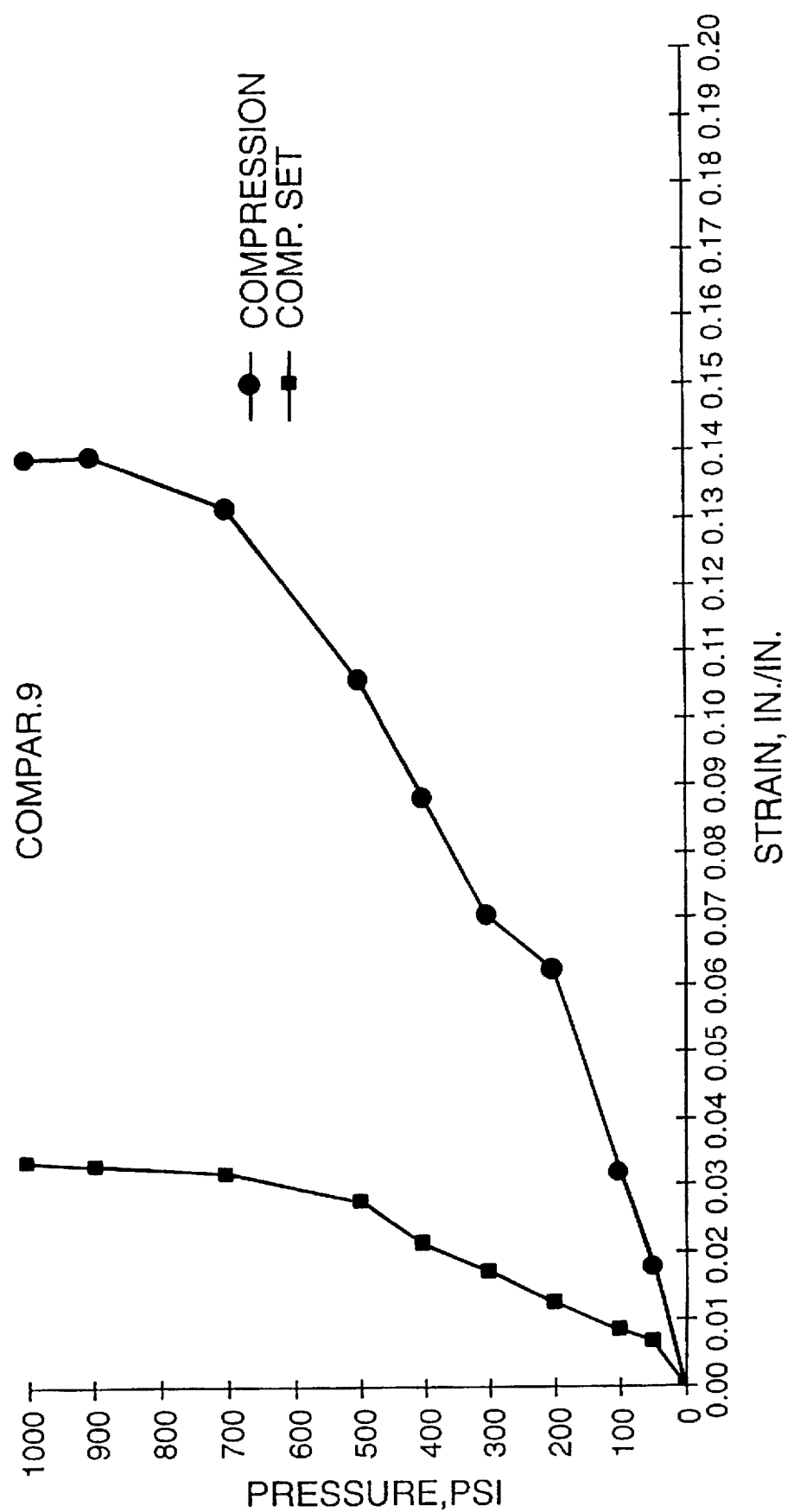
FIG. 11 is a graph showing the compression and permanent set for a noncompressed friction material comprising comparative example 9 impregnated with a phenolic resin.
Figure 12:
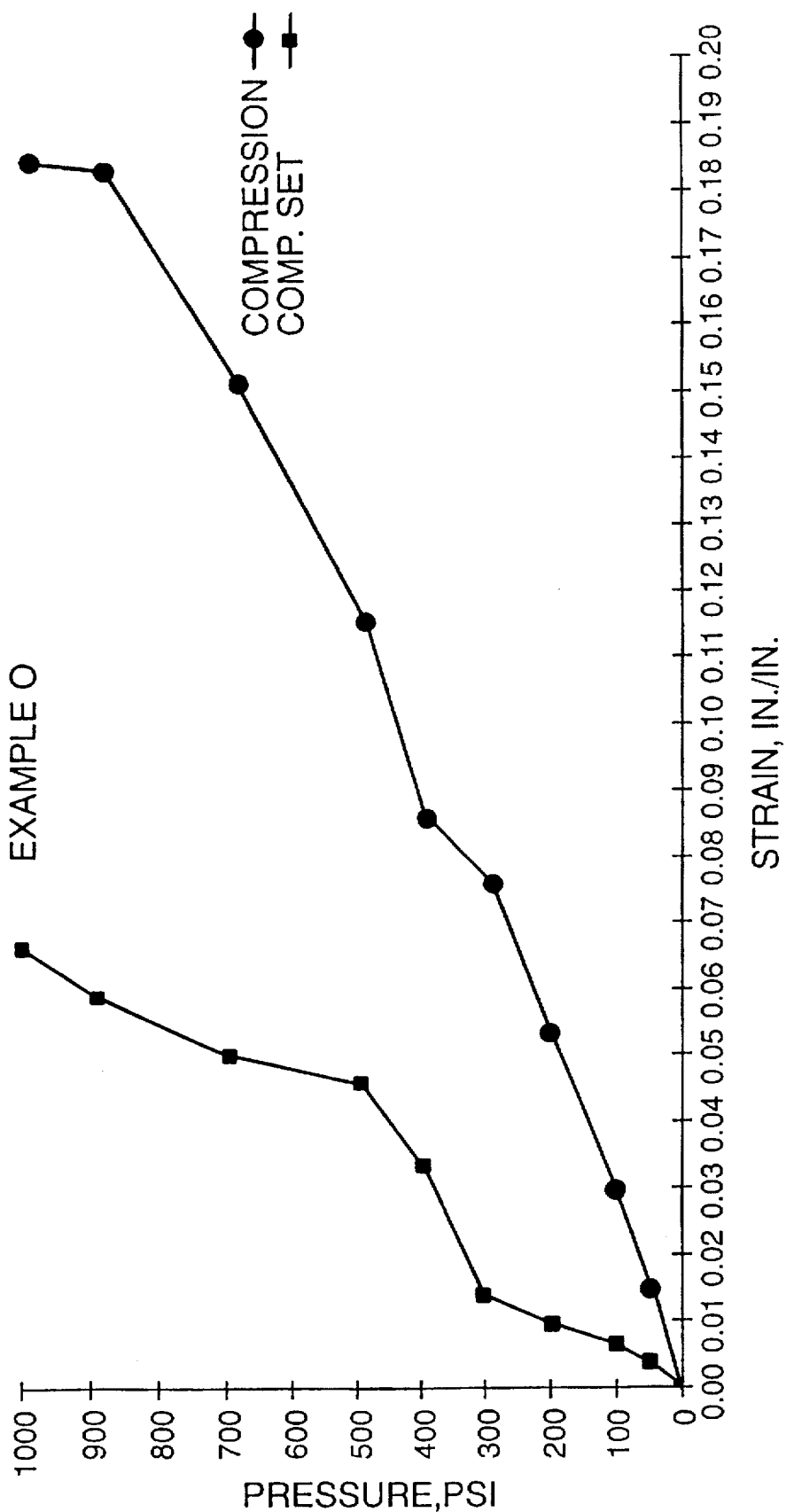
FIG. 12 is a graph showing the compression and permanent set for a noncompressed friction material comprising comparative example N impregnated with a phenolic resin.

FIG. 10 shows the compression and compression set for the Compar. 8. FIG. 11 shows the compression and compression set data for Compar. 9. FIG. 12 shows the compression and compression set for C Ex. O.

INDUSTRIAL APPLICABILITY

The present invention is useful as an energy friction material for use with clutch plates, transmission bands, brake shoes, synchronizer rings, friction disks or system plates and torque converters.

The above descriptions of the preferred and alternative embodiments are intended to be illustrative and are not intended to be limited upon the scope and content of the following claims.

We claim:

1. A two-ply fibrous base material for use in a non-asbestos friction material comprising a secondary or top layer bonded to a primary or lower layer, the primary layer comprising non-linearly elastic fibers, cotton fibers, and filler material; the secondary layer comprising porous carbon, cotton fibers, and aramid fibers.

2. The two-ply fibrous base material of claim 1, wherein the secondary layer comprising from about 2% to about 50% of the total combined two-ply thickness.

3. The two-ply fibrous base material of claim 1, wherein the primary layer comprises, in percent, by weight, based on the weight of the primary layer: about 5% to about 30% non-linearly elastic fibers, about 20% to about 60% cotton fibers, about 10% to 40% filler material, about 0% to about 20% friction particles, and about 0% to about 3% latex type processing aids.

4. The two-ply fibrous base material of claim 1, wherein the secondary layer comprises, in percent by weight based on the weight of the secondary layer: about 10% to 55% cotton fibers, about 5% to about 45% aramid fibers, and about 10% to about 40% porous carbon.

5. A non-asbestos friction material comprising a two-ply fibrous base material of claim 1 impregnated with a phenolic or modified phenolic resin, a silicone or modified silicone resin, or a blend of a phenolic or modified phenolic resin with a silicone or modified silicone resins.

6. A non-asbestos friction material comprising a two-ply fibrous base material of claim 5 impregnated with an epoxy phenolic modified resin.

7. A friction element according to claim 6 comprising a clutch facing.

8. A friction element according to claim 6 comprising a brake shoe lining.

9. The friction material of claim 5, wherein the friction material comprises about 30% to about 65% resin by weight.

10. The two-ply fibrous base material of claim 1 wherein the secondary layer further includes about 0 to abut 20% synthetic graphite.

11. The two-ply fibrous base material of claim 1 wherein the secondary layer further includes about 0 to about 40% filler material.

12. The two-ply fibrous base material of claim 1 wherein the secondary layer further includes processing aids.

13. A process for producing a non-asbestos friction material comprising forming a primary layer comprising non-linearly elastic fibers, cotton fibers and filler material; and adhering a secondary layer to the primary layer, the secondary layer comprising porous carbon, cotton fibers, and aramid fibers.

14. The process according to claim 13 in which the secondary layer further includes filler material.

15. The process according to claim 13 in which the secondary layer further includes synthetic graphite.

* * * * *